US009495587B2

(12) United States Patent
Wilson et al.

(10) Patent No.: US 9,495,587 B2
(45) Date of Patent: Nov. 15, 2016

(54) DOCUMENT UNBENDING AND RECOLORING SYSTEMS AND METHODS

(71) Applicants: Scott E. Wilson, Portland, OR (US); Peter W. Hildebrandt, Duluth, GA (US)

(72) Inventors: Scott E. Wilson, Portland, OR (US); Peter W. Hildebrandt, Duluth, GA (US)

(73) Assignee: STEELCASE INC., Grand Rapids, MI (US)

( * ) Notice: Subject to any disclaimer, the term of this patent is extended or adjusted under 35 U.S.C. 154(b) by 573 days.

(21) Appl. No.: 13/924,010

(22) Filed: Jun. 21, 2013

(65) Prior Publication Data

US 2013/0343609 A1    Dec. 26, 2013

Related U.S. Application Data

(60) Provisional application No. 61/663,362, filed on Jun. 22, 2012.

(51) Int. Cl.
| | | |
|---|---|---|
| *G06K 9/40* | (2006.01) | |
| *G06K 9/00* | (2006.01) | |
| *G06T 5/00* | (2006.01) | |
| *G06K 9/32* | (2006.01) | |
| *G06K 9/36* | (2006.01) | |

(52) U.S. Cl.
CPC ....... *G06K 9/00463* (2013.01); *G06K 9/00442* (2013.01); *G06K 9/3283* (2013.01); *G06T 5/006* (2013.01); *G06T 5/007* (2013.01); *G06K 2009/363* (2013.01); *G06T 2207/10008* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 5,497,236 A | 3/1996 | Wolff et al. | |
| 5,940,544 A | 8/1999 | Nako | |
| 6,011,635 A * | 1/2000 | Bungo | H04N 1/387 |
| | | | 358/463 |

(Continued)

FOREIGN PATENT DOCUMENTS

| | | |
|---|---|---|
| JP | 2011205167 A | 10/2011 |
| WO | 2012166982 A | 12/2012 |

OTHER PUBLICATIONS

Liangmith et al. "Flattening curved documents in images", Jun. 20-25, 2005, IEEE, CVPR 2005.*

(Continued)

*Primary Examiner* — Jason Heidemann
(74) *Attorney, Agent, or Firm* — Troutman Sanders LLP; Ryan A. Schneider; Christopher W. Glass

(57) ABSTRACT

According to one aspect, a system for processing a document image is disclosed. In an exemplary embodiment, the system includes an edge-detection unit configured to identify an edge of a document from a document image. The system also includes a keystone-correction unit and a flattening unit. The keystone-correction unit is configured to correct keystone distortion in the document image. The flattening unit is configured to flatten content of the document in the document image.

32 Claims, 14 Drawing Sheets

(56) References Cited

U.S. PATENT DOCUMENTS

| | | | |
|---|---|---|---|
| 6,577,762 B1* | 6/2003 | Seeger | G06K 9/38 382/173 |
| 7,010,745 B1 | 3/2006 | Shimada et al. | |
| 7,072,527 B1 | 7/2006 | Nako | |
| 7,330,604 B2 | 2/2008 | Wu et al. | |
| 7,418,126 B2 | 8/2008 | Fujimoto et al. | |
| 7,593,595 B2 | 9/2009 | Heaney, Jr. et al. | |
| 7,808,681 B2* | 10/2010 | Hatzav | G03G 15/221 358/474 |
| 2003/0048271 A1 | 3/2003 | Liess et al. | |
| 2003/0156201 A1 | 8/2003 | Zhang | |
| 2005/0053304 A1 | 3/2005 | Frei | |
| 2007/0206877 A1* | 9/2007 | Wu | G06K 9/3283 382/275 |
| 2009/0086275 A1 | 4/2009 | Liang et al. | |
| 2009/0175537 A1* | 7/2009 | Tribelhorn | G06K 9/00463 382/173 |

OTHER PUBLICATIONS

Brown et al., Conformal deskewing of nonplanar documents, 2005, CVPR'05, pp. 998-1004.*

Liang et al., Geometric rectification of camera-captured document images, 2008, IEEE, 30(4):591-605.*

Meng et al. Shading Extraction and Correction for Scanned Book Images, 2008, IEEE, vol. 15.*

The International Search Report and Written Opinion dated Mar. 13, 2014.

Liang, et al., "Camera-Based Analysis of Text and Documents: A Survey," International Journal of Document Analysis and Recognition, vol. 7, No. 2-3. Jul. 1, 2005, pp. 84-104.

Ohk, et al., "A Restoration method for Distorted Image Scanned from a Bound Book," Proceedings of SPIE, vol. 7866, Jan. 23, 2011, pp. 78661T-78661T-8.

Fan, et al., "A Comprehensive Image Processing Suite for Book Remastering," Eights International Proceedings on Document Analysis and Recognition, IEEE, Aug. 31, 2005, pp. 447-451.

Jagannathan, et al., "Perspective Correction Methods for Camera-Based Document Analysis," Proceedings of the First International Workshop on Camera-Based Document Analysis and Recognition, Aug. 29, 2005.

Xiaogang, et al., "Correction of Scanned Book Images," Tsinghua Science and Technology, Tsinghua University Press, China, vol. 8, No. 5, Oct. 1, 2003, pp. 624-627.

International Preliminary Report on Patentability for related PCT/US2013/047021 mailed Dec. 31, 2014.

* cited by examiner

DOCUMENT UNBENDING AND RECOLORING SYSTEMS AND METHODS

CROSS-REFERENCE TO RELATED APPLICATION

This application claims the benefit under 35 U.S.C. §119 (e) of U.S. Provisional Patent Application Ser. No. 61/663,362, filed Jun. 22, 2012, which is hereby incorporated by reference in its entirety.

TECHNICAL FIELD

Various embodiments of the present invention relate to image processing and, more particularly, to systems and methods for unbending and recoloring a document appearing in an image.

BACKGROUND

As electronic books become more popular, some companies and individuals are conducting processes to convert paper books into electronic format. A step in this process is often capturing an image of a page of the book. After the image is captured, it may be desirable to process the image to make the text of the page more readable and appealing to the eye.

SUMMARY

There is a need for processing systems and methods for processing images of physical documents, such as book pages, to increase readability and aesthetic appeal. It is to such systems and methods that various embodiments of the present invention are directed.

According to one aspect, the present invention relates to a system for processing a document image. In an exemplary embodiment, the system includes an edge-detection unit configured to identify an edge of a document from a document image. The system also includes a keystone-correction unit and a flattening unit. The keystone-correction unit is configured to correct keystone distortion in the document image. The flattening unit is configured to flatten content of the document in the document image.

According to another aspect, the present invention relates to a system for processing a document image which, in an exemplary embodiment, includes an edge-detection unit configured to identify an edge of a document from the document image, where identifying the edge includes applying an edge finding filter to the document image and/or selecting a ranked potential edge of the document image. The system also includes a keystone-correction unit and a flattening unit. The keystone-correction unit is configured to correct keystone distortion in the document image. The flattening unit is configured to flatten content of the document in the document image.

According to yet another aspect, the present invention relates to a method of processing a document image. In one exemplary embodiment, the method includes identifying an edge of a document from a document image and correcting keystone distortion in the document image. The method also includes flattening content of the document in the document image.

Briefly described, various embodiments of the present invention are processing systems and methods, or image-processing systems and methods, for processing an image so as to virtually unbend the pages of a document within the image. These embodiments can be particularly useful for processing images of books, which images often appear distorted as a result of the book's spine preventing the pages from lying within a plane during image capture. An exemplary embodiment of the processing system can comprise an edge-detection unit, a keystone-correction unit, a flattening unit, and a recoloring unit.

After an image is captured of a document, the edge-detection unit can identify edges of the document in the image. In an exemplary embodiment, one or more edge-finding filters can be applied to the image. One of the edge-finding filters can be a convolution filter. For the convolution filter, a plurality of potential edges can be identified and then ranked by a predetermined algorithm to identify the most likely potential edges of the document. The highest ranked potential edges proximate each of the four sides of the image can be deemed edges of the document. If multiple edge-finding algorithms are used, then the edge-detection unit can rank the resulting potential edges and select a subset of the potential edges to identify as edges of the document.

The keystone-correction unit can reduce or correct keystone distortion in the image. Various methods can be used to correct keystoning in the image. For a first example, if the field of view of the image-capture device used to capture the image is known, then that field of view can be used to calculate a series of rotations to apply to the image, so as to make the document appear flat. For a second example, after the edges of the document are detected, the corners of the document can be identified based on those edges. The keystone-correction unit can then distort the image so as to position the corners to form a rectangle. After keystone-correction, it can be assumed that the left and right edges of the document are straight and vertical. If either or both of these edges are not straight at this point, some exemplary embodiments of the keystone-correction unit can replace the curved left or right edge with a straight vertical line between the appropriate corners of the document.

The flattening unit can reduce the curve of the text that generally results from the pages of a bound book being bent away from the binding to the surface upon which the book sits. To flatten the source image, the flattening unit can generate a destination image. For each pixel in the destination image, the flattening unit can choose a pixel from the source image to copy into that destination image pixel. Because the left and right sides of the book were made vertical during keystone-correction, it can be assumed that the horizontal distortion in the image is already corrected. Accordingly, the horizontal coordinate from the source image chosen for an examined pixel in the destination image can be equivalent to the horizontal coordinate of the examined pixel itself. The flattening unit can correct the vertical distortion by determining a virtual first horizontal line passing through the topmost vertical coordinate of the source image and by determining a virtual second horizontal line passing through the bottommost vertical coordinate of the source image. For each vertical column of pixels in the destination image, a linear function can be determined representing a linear interpolation between the downward shift from the first horizontal line to the top edge of the document in the source image and the upward shift from the second horizontal line to the bottom edge of the document in the source image.

At some point during the image processing, the recoloring unit can convert the image to grayscale, black and white, sepia, or to some other desired color palette. In some exemplary embodiments, the recoloring unit can determine a plurality of background levels for the image. The unit can then correct for brightness and color variations across the image, based on the background levels, as well as increase the contrast of the image.

These and other objects, features, and advantages of the processing systems and methods will become more apparent upon reading the following specification in conjunction with the accompanying drawing figures.

BRIEF DESCRIPTION OF THE FIGURES AND APPENDICES

DETAILED DESCRIPTION

Figure 1:
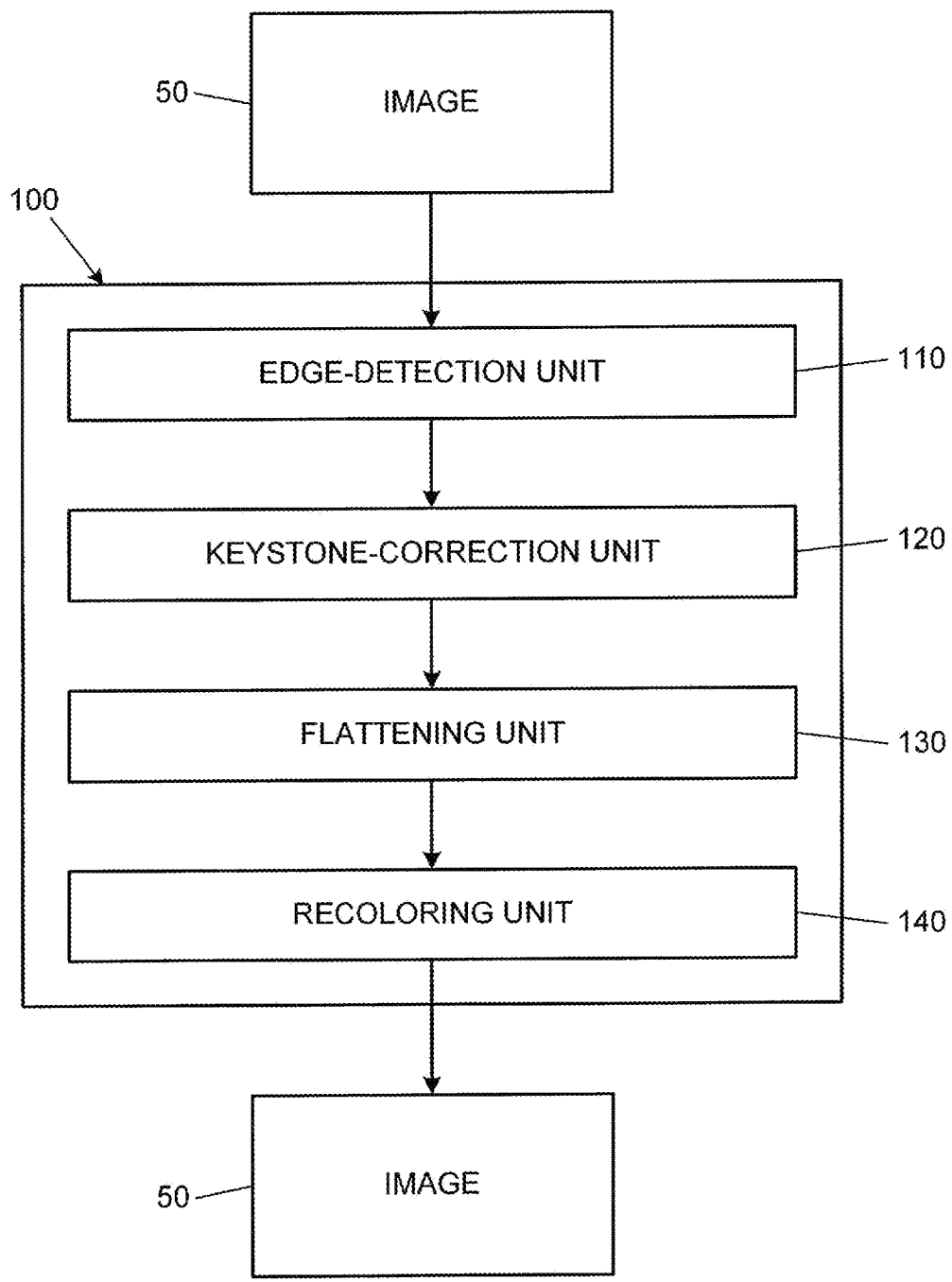
FIG. 1 illustrates a flow diagram of a processing system, according to an exemplary embodiment of the present invention.

To facilitate an understanding of the principles and features of the present invention, various illustrative embodiments are explained below. In particular, the present invention is described in the context of being a processing system for unbending an image of an open book. Embodiments of the present invention, however, are not limited to this context. Rather, various aspects of the present invention can apply to other types of image-processing as well, such as processing images captured of a whiteboard.

The materials and components described hereinafter as making up elements of the present invention are intended to be illustrative and not restrictive. Many suitable materials and components that would perform the same or similar functions as the materials and components described herein are intended to be embraced within the scope of the present invention. Other materials and components not described herein can include, but are not limited to, for example, similar or analogous materials or components developed after development of the present invention.

Various embodiments of the present invention are processing systems and methods for processing images of books or other documents. Referring now to the figures, in which like reference numerals represent like parts throughout the views, various embodiments of the processing systems and methods will be described in detail.

FIG. 1 illustrates a flow diagram of a processing system 100, according to an exemplary embodiment of the present invention. As shown, the processing system 100 can comprise an edge-detection unit 110, a keystone-correction unit 120, a flattening unit 130, and a recoloring unit 140. After an image 50 is received by the processing system 100, the image 50 can be processed in turn by each unit. In an exemplary embodiment, processing of the image 50 can proceed from the edge-detection unit 110 to the keystone-correction unit 120, to the flattening unit 130, and then to the recoloring unit 140. The resulting image 50 of each unit's processing can be delivered to the next unit in line for further processing. Other embodiments of the present invention, however, can conduct image-processing in various other orders.

Generally, the edge-detection unit 110 can identify edges of the book or pages in the image 50; the keystone-correction unit 120 can reduce or remove keystoning in the image 50; the flattening unit 130 can flatten or straighten text or objects in the image 50; and the recoloring unit 140 can convert the image 50 to grayscale, black and white, or some other desired color profile.

The units of the processing system 100 can be programs, program modules, or other operative components of the processing system 100. The units can comprise hardware, software, or a combination thereof. Although these units are described herein as being distinct components, this need not be the case. The units are distinguished herein based on operative distinctiveness, but they can be implemented in various fashions, wherein the elements or components making up the various units can overlap or be divided in a manner other than that described herein.

In an exemplary embodiment of the processing system 100, the original image 50 is captured of an open book or other document before processing begins. The image 50 can be captured with an image-capture device, such as a still camera, video camera, flatbed scanner, handheld scanner, or the like.

The image-capture device can be, for example, a camera supported on and integrated with a stand, where the stand can have a flexible or articulated neck. Accordingly, the book and the camera stand can be positioned on a common surface, and the camera can be positioned and angled to capture pages of the book when the book is open. In some embodiments, the camera can comprise one or more of an inclinometer, ultrasound sensor, and auto-focus mechanism. The inclinometer can detect the orientation of the camera relative to the direction of gravity. The ultrasound sensor can detect the distance between the camera and the book. The auto-focus mechanism can, in addition to automatically focusing on the book, provide feedback to the camera regarding the distance from the camera to the book. Data received by the camera from the inclinometer, ultrasound sensor, or auto-focus mechanism can be utilized by some embodiments the processing system 100 to increase efficiency or accuracy during image processing.

In an image 50 captured of an open bound book, facing pages generally extend and curve away from the binding. The distance between the image-capture device and various portions of the pages of the book can vary, as the open face of the book generally cannot be flattened into a plane. As a result, the image 50 captured of the book can include distortions, where the edges and text lines of the book can appear to be curved, stretched, or squished in places. Various exemplary embodiments of the present invention can reduce or remove this distortion, thereby increasing legibility and making the image 50 more pleasing to the eye.

Figure 2A:
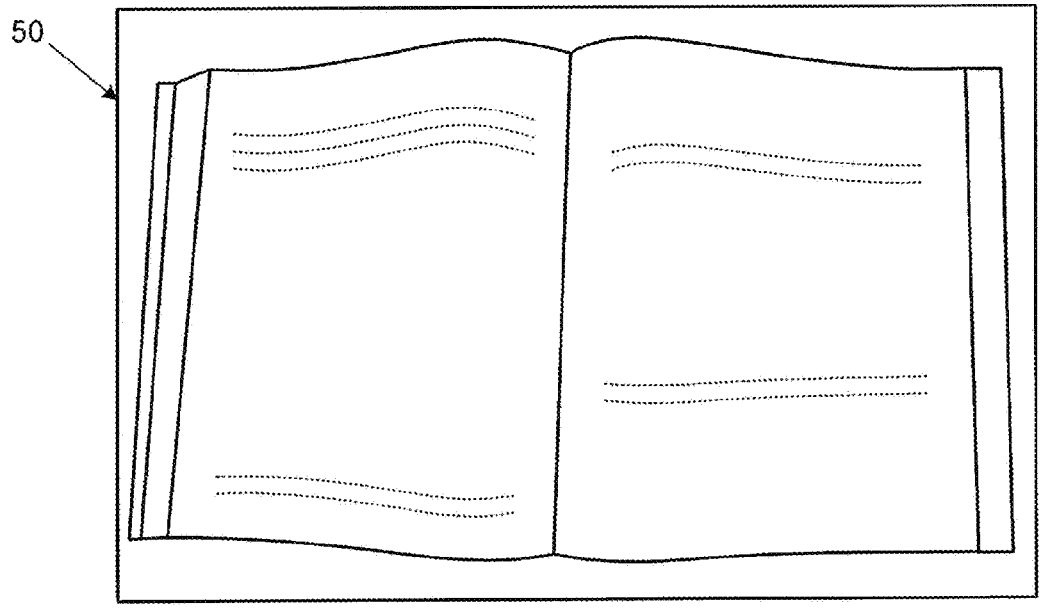
FIGS. 2A-2B illustrate an exemplary result of processing an image by the processing system, according to an exemplary embodiment of the present invention.
Figure 2B:
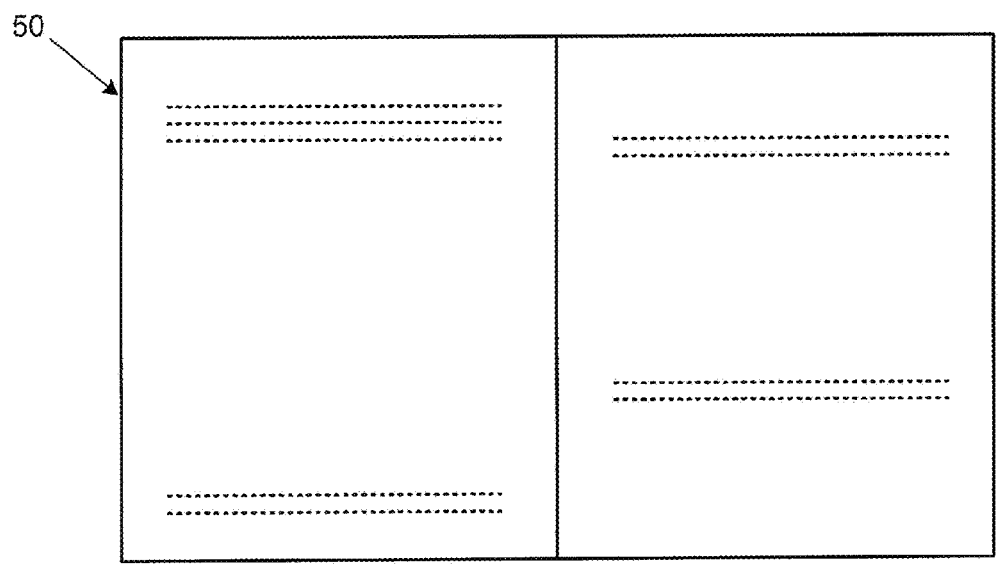

FIGS. 2A-2B illustrate an exemplary result of processing an image 50 by the processing system 100, according to an exemplary embodiment of the present invention. FIG. 2A illustrates an example of an original image 50 of a book captured by an image-capture device, while FIG. 2B illustrates an exemplary result image 50 after processing the original image 50 of FIG. 2A. As shown, the resulting image 50 can comprise one or more pages having left and right edges that are generally vertical, along with text extending in a generally horizontal direction. This resulting image 50 can be easier for a person to read, and if automated character-recognition is desired, the resulting image 50 can lead to more accurate character-recognition results than would the original image 50.

The processing system 100 can be integrated, in whole or in part, in a computing device 300. The processing system 100 can be embodied in a computer-readable medium and executed by a computer processor on a computing device 300 to provide one, some, or all aspects of the present invention.

Figure 3:
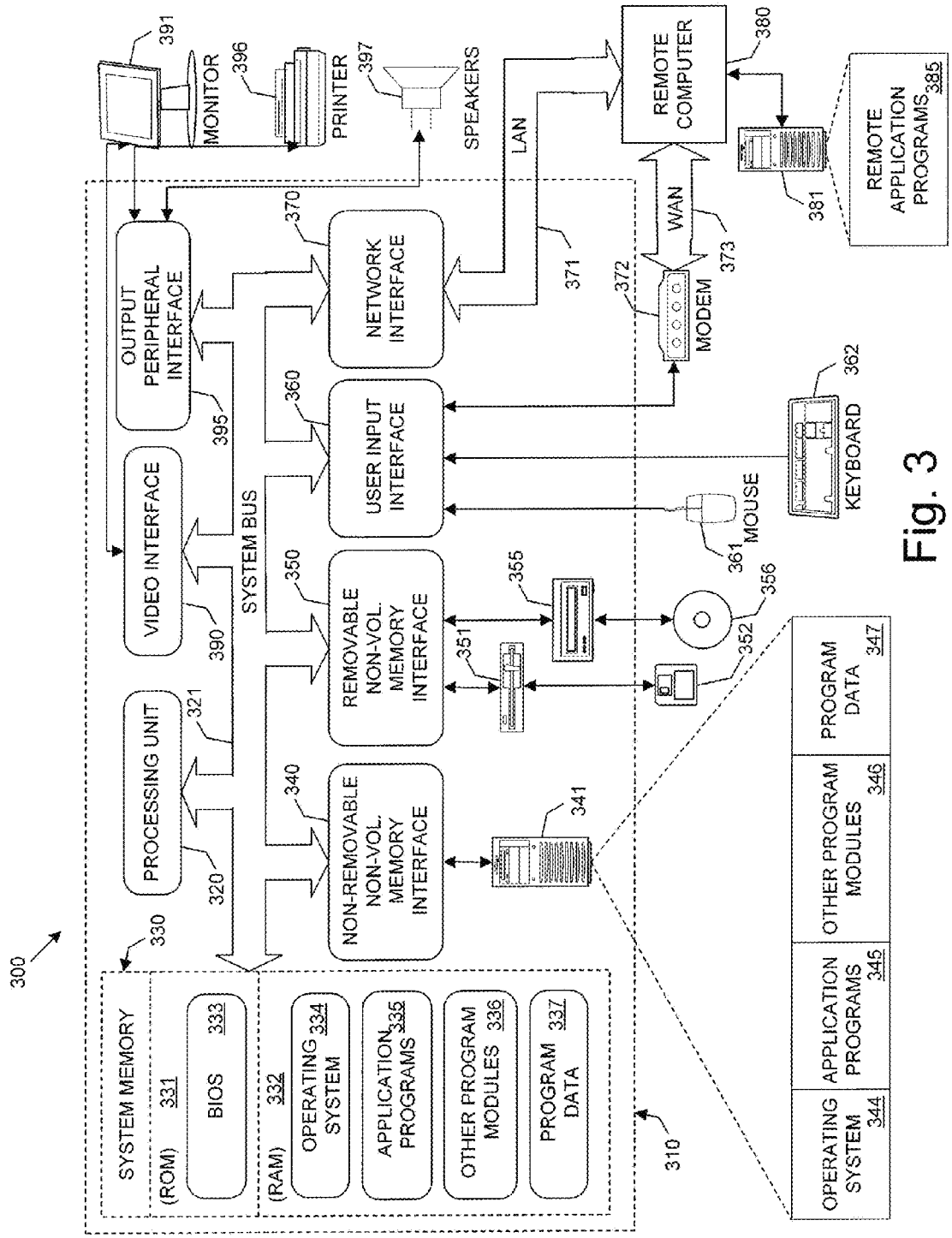
FIG. 3 illustrates an architecture of a computing device in which the processing system can be embodied in whole or in part, according to an exemplary embodiment of the present invention.

FIG. 3 illustrates an architecture of a computing device 300 in which the processing system 100 can be embodied in whole or in part, according to an exemplary embodiment of the present invention. Although specific components of a computing device 300 are illustrated in FIG. 3, the depiction of these components in lieu of others does not limit the scope of the present invention. Rather, various types of computing devices can be used to implement embodiments of the processing system 100. Exemplary embodiments of the processing system 100 can be operational with numerous other general purpose or special purpose computing system environments or configurations. Examples of well known computing systems, environments, and/or configurations that may be suitable for use with the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, or the like.

With reference to FIG. 3, components of the computing device 300 can comprise, without limitation, a processing unit 320 and a system memory 330. A system bus 321 can couple together various system components, including the system memory 330 to the processing unit 320. The system bus 321 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 300 can include a variety of computer readable media. Computer-readable media can be any available media that can be accessed by the computing device 300, including both volatile and nonvolatile, and both removable and non-removable media. For example, and not limitation, computer-readable media can comprise computer storage media and communication media. Computer storage media can include both volatile and nonvolatile, and removable and non-removable media implemented in any method or technology for storage of information such as computer readable instructions, data structures, program modules, or other data. Computer storage media can include, but is not limited to, RAM, ROM, EEPROM, flash memory, other memory technology, CD-ROM, digital versatile disks (DVD), other optical disk storage, magnetic cassettes, magnetic tape, magnetic disk storage, other magnetic storage devices, or other medium that can be used to store data accessible by the computing device 300.

Communication media can typically contain computer-readable instructions, data structures, program modules, or other data in a modulated data signal, such as a carrier wave or other transport mechanism. The term "modulated data signal" means a signal that has one or more of its characteristics set or changed in such a manner as to encode information in the signal. For example, and not limitation, communication media can include wired media such as a wired network or direct-wired connection, and wireless media such as acoustic, RF, infrared, or other wireless media. Combinations of the above can also be included within the scope of computer readable media.

The system memory 330 can comprise computer storage media in the form of volatile or nonvolatile memory, such as read only memory (ROM) 331 and random access memory (RAM) 332. A basic input/output system 333 (BIOS), containing the basic routines that help to transfer information between elements within the computing device 300, such as during start-up, can typically be stored in the ROM 331. The RAM 332 typically contains data or program modules that are immediately accessible to or presently in operation by the processing unit 320. For example, and not limitation, FIG. 3 illustrates operating system 334, application programs 335, other program modules 336, and program data 337.

The computing device 300 can also include other removable or non-removable, and volatile or nonvolatile computer storage media. By way of example only, FIG. 3 illustrates a hard disk drive 341 that can read from or write to non-removable, nonvolatile magnetic media, a magnetic disk drive 351 for reading or writing to a nonvolatile magnetic disk 352, and an optical disk drive 355 for reading or writing to a nonvolatile optical disk 356, such as a CD ROM or other optical media. Other removable or non-removable, and volatile or nonvolatile computer storage media that can be used in the exemplary operating environment can include magnetic tape cassettes, flash memory cards, digital versatile disks, digital video tape, solid state RAM, solid state ROM, or the like. The hard disk drive 341 can be connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3 can provide storage of computer readable instructions, data structures, program modules and other data for the computing device 300. For example, hard disk drive 341 is illustrated as storing an operating system 344, application programs 345, other program modules 346, and program data 347. These components can either be the same as or different from operating system 334, application programs 335, other program modules 336, and program data 337.

A web browser application program 335, or web client, can be stored on the hard disk drive 341 or other storage media. The web client 335 can comprise an application program 335 for requesting and rendering web pages, such as those created in Hypertext Markup Language ("HTML") or other markup languages. The web client 335 can be capable of executing client side objects, as well as scripts through the use of a scripting host. The scripting host can execute program code expressed as scripts within the browser environment. Additionally, the web client 335 can execute web applications, which can be embodied in web pages.

A user of the computing device 300 can enter commands and information into the computing device 300 through input devices such as a keyboard 362 and pointing device 361, commonly referred to as a mouse, trackball, or touch pad. Other input devices (not shown) can include a microphone, joystick, game pad, satellite dish, scanner, electronic white board, or the like. These and other input devices are often connected to the processing unit 320 through a user input interface 360 coupled to the system bus 321, but can be connected by other interface and bus structures, such as a parallel port, game port, or a universal serial bus (USB). A monitor 391 or other type of display device can also be connected to the system bus 321 via an interface, such as a video interface 390. In addition to the monitor, the computing device 300 can also include other peripheral output devices, such as speakers 397 and a printer 396. These can be connected through an output peripheral interface 395.

The computing device 300 can operate in a networked environment using logical connections to one or more remote computers, such as a remote computer 380. The remote computer 380 can be a personal computer, a server, a router, a network PC, a peer device, or other common network node, and can include many or all of the elements described above relative to the computing device 300. The logical connections depicted in FIG. 3 include a local area network (LAN) 371 and a wide area network (WAN) 373, but can also include other networks.

When used in a LAN networking environment, the computing device 300 can be connected to the LAN 371 through a network interface or adapter 370. When used in a WAN networking environment, the computing device 300 can include a modem 372 or other means for establishing communications over the WAN 373, such as the internet. The modem 372, which can be internal or external, can be connected to the system bus 321 via the user input interface 360 or other appropriate mechanism. In a networked environment, program modules depicted relative to the computing device 300 can be stored in the remote memory storage device. For example, and not limitation, FIG. 3 illustrates remote application programs 385 as residing on memory device 381. It will be appreciated that the network connections shown are exemplary and other means of establishing a communications link between the computers can be used.

Referring now back to FIG. 1, as discussed above, the processing system 100 can comprise an edge-detection unit 110, a keystone-correction unit 120, a flattening unit 130, and a recoloring unit 140. These units can be embodied, in whole or in part, in a computing device 300, such as that described above. For example, one or more of these units can be stored on removable or non-removable computer-readable media of the computing device 300, and the units can be in communication with one another and with other components of the computing device 300 as necessary for operation of the processing system 100.

After the processing system 100 receives an image 50 of a document, such as one or more pages of a bound book, the edge-detection unit 110 can process the image 50. The edge-detection unit 110 can apply one or multiple edge-finding algorithms to the image 50 to identify edges of the document within the image 50. In some embodiments, the edge-detection unit 110 need not distinguish between the edges of the outer book cover and the edges of the one or more pages in the image 50. Good results can be achieved regardless of whether the edges of the book cover or the edges of the pages are identified. Accordingly, the term "document" is used herein to refer to the book or one or more pages of the book appearing in the image 50.

An edge-finding algorithm used by the edge-detection unit 110 can utilize a convolution filter. With a convolution filter, the color values of varying groups of pixels can be multiplied by a filter matrix. The values in the filter matrix can be chosen to emphasize certain characteristics of the pixels. In the case of an exemplary edge-detecting convolution filter, when applied to search for generally horizontal edges, each value in a top portion of the filter matrix can be positive, and each value in a bottom portion of the filter matrix can be negative. For example, each value in the top half of the filter matrix can be 1, and each value in the bottom half can be −1. Alternatively, negative values can be on the top, while positive values are on the bottom. The top and bottom of the filter can thus have opposite values of the same magnitude. In some exemplary embodiments, the filter can be applied only to a single channel of the color values of the pixels. For example, and not limitation, the filter can be applied to the green channel, as the green channel may generally comprise the lowest noise of the traditional red, green, and blue color channels when certain cameras are used to capture the original image 50 of the document.

The result of applying the filter to the color values of a set of pixels (i.e., multiplying the filter matrix by the matrix of color values of the set of pixels) in the image 50 can be a matrix of result values. Next, the top set of the result values, which correspond to the pixels multiplied by a first value, can be summed with the bottom set of the result values, which correspond to the pixels multiplied by an opposite second value. Because of the use of opposite values, a uniform original pixel area will result in a sum of approximately zero magnitude. In contrast, if the filter is applied to an edge, where there is contrast between the top and bottom portions of the filtered pixels, then the sum will result in a positive or negative value, the magnitude of which can indicate a degree of change in luminance, or brightness, across the filtered pixels. A positive or negative resulting value can indicate an edge, and the magnitude of the value can indicate the strength, or contrast level, of the edge.

In an exemplary embodiment, the edge-detection unit 110 can apply an edge-finding algorithm one or more times to identify horizontal edges, and one or more times to identify vertical edges. The above example of a convolution filter for edge-finding describes a method of finding horizontal edges. The same or similar filter can be used with the left and right sides, instead of the top and bottom, of the filter being opposite colors to identify vertical edges. In a further exemplary embodiment, an edge-finding algorithm can be applied on only a portion of the image 50. For example, the above convolution filter, or another filter, can be applied from the outside inward, and only a fraction of the image 50 need be examined. For example, and not limitation, the filter can be applied to the top third, bottom third, left third, and right third of the image 50 to respectively identify the top edge, bottom edge, left edge, and right edge of the document in the image 50.

An additional, or alternative, edge-finding algorithm used can be a histogram method. In this algorithm, the edge-detection unit 110 can determine a first histogram representing a band of pixels at the perimeter of the image 50. For example, a set of pixels within a predetermined distance from the perimeter edge of the image 50 can comprise this band. The first histogram can represent the range or tally of colors of the pixels within the band. The edge-detection unit 110 can also determine a second histogram for a set of pixels at or proximate the center of the image 50. For example, the second histogram can be based on the colors of pixels within a predetermined rectangular area centered at or proximate the center of the image 50. A first representative value of the first histogram can be identified, and a second representative value of the second histogram can be identified. For example, and not limitation, a representative value can be an average value, such as a mean, median, or mode of the values making up the respective histogram. A threshold value can be set to the average of the first and second representative values. After the threshold value is calculated, the edge-detection unit 110 can analyze the image 50 from the outside to the inside. A pixel can be deemed part of an edge if that pixel's color value is on one side of the threshold, while a neighboring or proximate pixel's threshold value is on the other side of the threshold value.

In an exemplary embodiment, the edge-detection unit 110 can identify four edges for use by the other units of the processing system 100. Each of the four edges can delineate each of the top, bottom, left, and right of the document in the image 50. In some instances, an edge-finding algorithm can identify more than four edges. In an exemplary embodiment of the edge-detection unit 110, potential edges can be selected liberally, so as to improve the chances of identifying the actual edges of the document. Further, if multiple edge-finding algorithms are used, then more than four total edges can be identified by the combination of algorithms. In this case, the edge-detection unit 110 can apply a predetermined ranking algorithm to the edges identified by the edge-finding algorithms.

The ranking algorithm can consider a combination of one or more of the following factors: length of the edge, smoothness of the edge (e.g., lack of sharp corners), strength of the edge-indicating signal used to select the edge (e.g., magnitude of the sum when using the above convolution filter), closeness of orientation to exact horizontal or vertical, proximity to edge of the image 50, and other factors that may be relevant to whether a detected potential edge is an actual edge of the document in the image 50. An additional factor can be whether a potential edge intersects or nearly intersects one or more other potential edges, as an edge of the document would be expected to meet another edge of the document at a corner of the document. Based on the rankings of the edges, four appropriate edges can be selected by the edge-detection unit 110, including a top edge, a bottom edge, a left edge, and a right edge.

Figure 4:
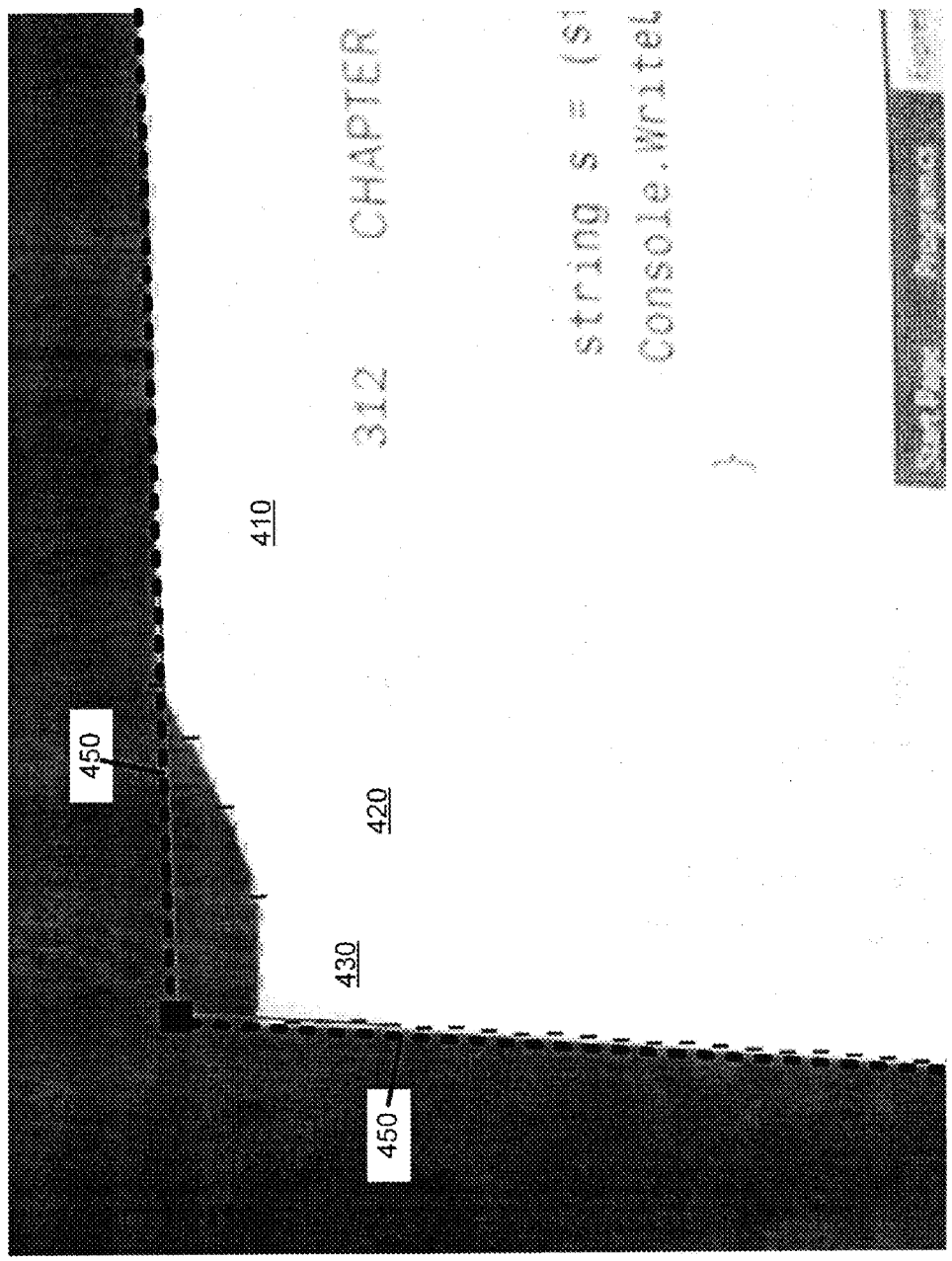
FIG. 4 illustrates identification of a corner of a document in the image, according to an exemplary embodiment of the present invention.

In some instances, the identified edges may intersect where the pages of the book drop off from the edge of a page to the cover. FIG. 4 illustrates an example of such an instance, in which the edges 450 are depicted with dotted lines. As shown in FIG. 4, a topmost page 410 can have a plurality of other pages 420 between it and the book cover 430. The top page 410 and the other pages 420 can vary in their respective distances to the edge of the cover 430. Accordingly, if the cover 430 is identified as a side edge of the document by the edge-detection unit 110, then the identified top edge or the identified bottom edge may follow the edges of the other pages 420 to intersect the identified edge of the cover 430. The edge-detection unit 110 can detect this drop-off by detecting that one of the edges 450 dips or varies significantly from its path before reaching another edge 450. In this case, the edge-detection unit 110 can automatically extend the edges 450 to intersect at a corner, as shown in FIG. 4.

Figure 5:
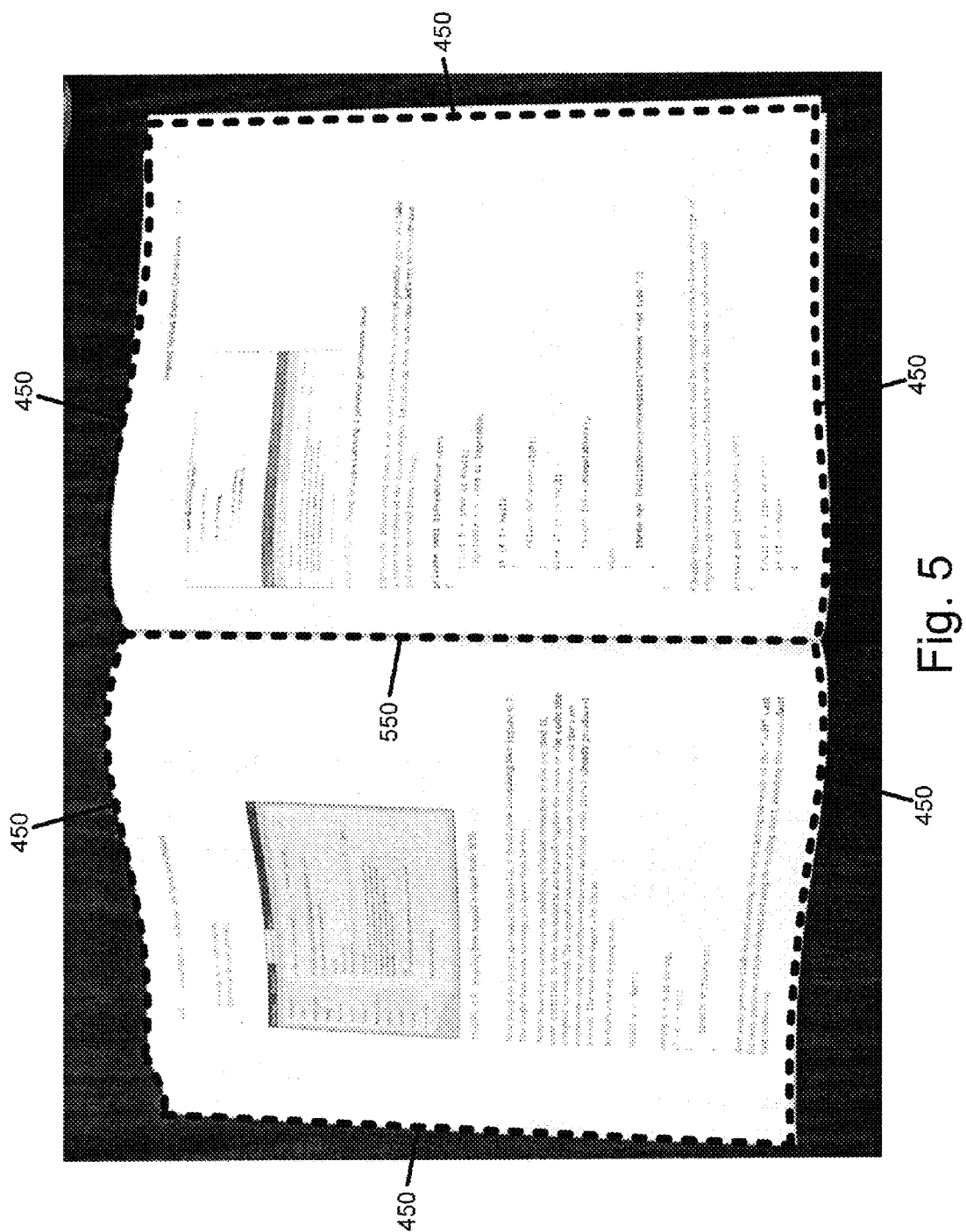
FIG. 5 illustrates an exemplary result of edge-finding in the processing system, according to an exemplary embodiment of the present invention.

FIG. 5 illustrates an exemplary result of edge-finding in the processing system 100, according to an exemplary embodiment of the present invention. In FIG. 5, the identified edges 450 are depicted with dotted lines. As shown in FIG. 5, some embodiments of the edge-detection unit 110 can identify the binding 550 of the book as an edge of each of the facing pages. The edge-detection unit 110 can then identify the three additional edges 450 of each page separately. The binding 550 can be identified by searching for a dark substantially vertical edge proximate the horizontal center of the image 50. To this end, one or more edge-finding algorithms can be used, such as those edge-finding algorithms described above. In contrast to FIG. 5, however, some embodiments of the edge-detection unit 110 can treat the document in the image 50 as a single page, and these embodiments need not find the boundary or binding 550 between two pages in the image 50.

As shown in FIG. 5, the edges 450 of the document may not meet in a rectangle. Rather, the corners can be a combination of acute and obtuse angles, and the edges 450 may be curved. The distortion of the document into these curves and acute and obtuse angles is commonly referred to as keystoning or keystone effect. The keystone-correction unit 120 can reduce the keystoning in the image 50, preferably after the edges 450 of the image 50 are identified.

Figure 6A:
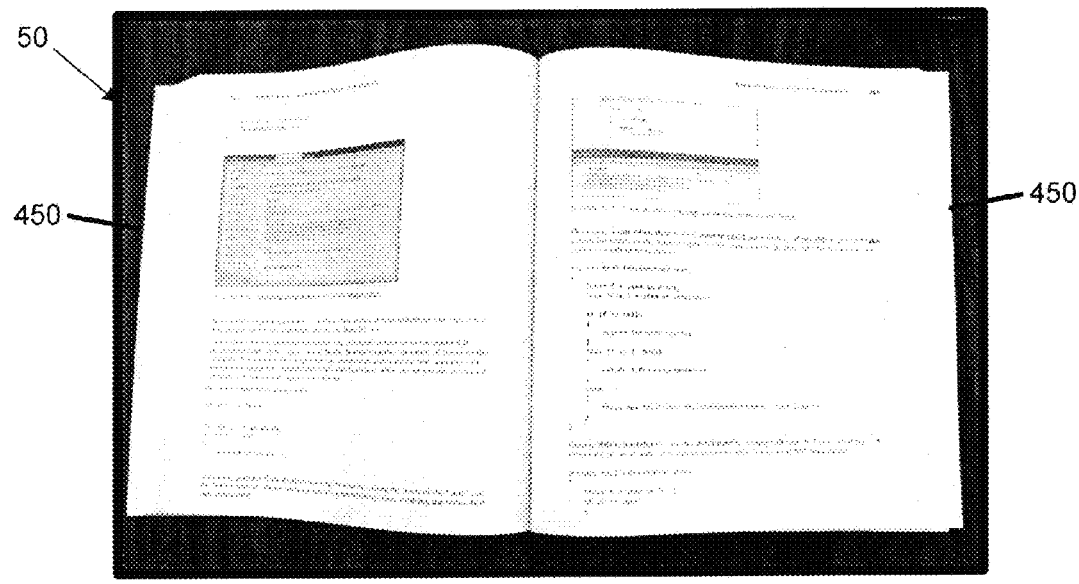
FIGS. 6A-6B illustrate an exemplary result of keystone-correction in the processing system, according to an exemplary embodiment of the present invention.
Figure 6B:
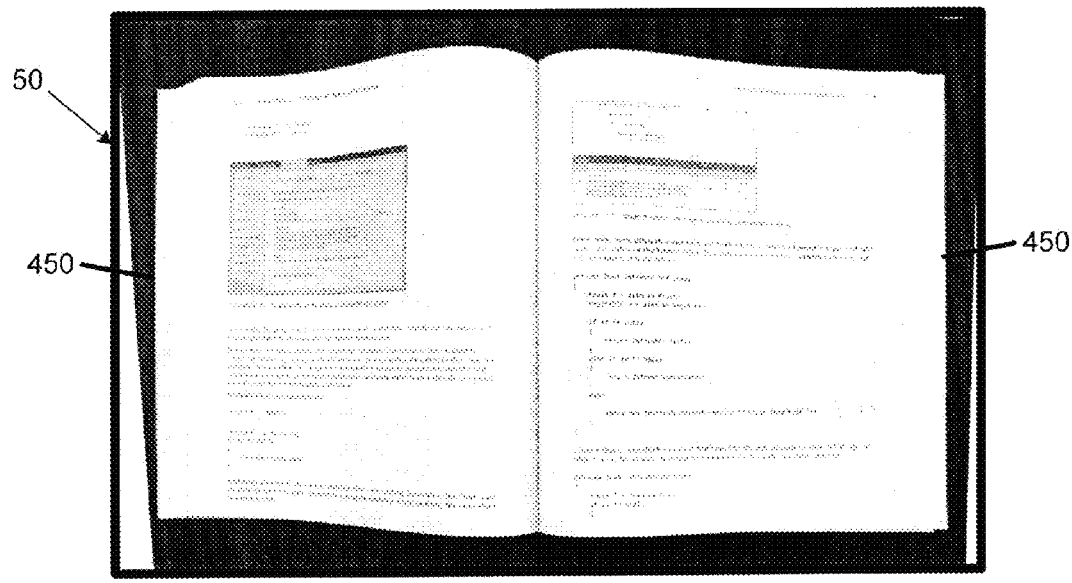

The keystone-correction unit 120 can utilize one or more algorithms to reduce or correct keystoning of the image 50 after the edges 450 are identified. FIGS. 6A-6B illustrate an exemplary result of keystone-correction in the processing system 100, according to an exemplary embodiment of the present invention. As shown, the keystone-correction unit 120 can cause the left and right edges 450 to be vertical, thus correcting the horizontal distortion of the image 50.

Various methods can be used to correct keystoning in the image 50. Some exemplary embodiments of the keystone-correction unit 120 can use one or both of a rotation method and a distortion method. Either or both of these methods can utilize the coordinates of the corners of the document. After the edges 450 of the document are detected, such as by the edge-detection unit 110, the corners of the document can be identified as the intersections of those edges 450. Accordingly, the coordinates of the corners can be available to the keystone-correction unit 120.

The rotation method can be used if the field of view of the image-capture device used to capture the image 50 is known. In that case, the field of view can be used to calculate a series of rotations to apply to the image 50, so as to position the corners of the document into the corners of a rectangle.

In the distortion method, after the corners are identified, the keystone-correction unit 120 can stretch and skew the image 50 so as to position the corners into a rectangle. The left and right edges 450 of the document can be virtually extended in straight lines to the top and bottom of the image 50. Each horizontal row of pixels between these extended edges 450 can be stretched so that each of the horizontal rows is the same length and comprises the same number of pixels, thus placing the left and right extended edges 450 into vertical orientation. The term "stretching" herein includes stretching by a fractional factor, thus resulting in shrinking. In some embodiments, the extended left and right edges 450 of the document can then become, respectively, the left and right sides of the image 50.

After keystone-correction, it can be assumed that the left and right edges 450 of the document are straight and vertical. If either or both of these edges 450 are not straight at this point, some exemplary embodiments of the keystone-correction unit 120 can replace a non-straight left or right edge with a straight vertical line between the appropriate corners of the document.

In some exemplary embodiments of the keystone-correction unit 120, two or more keystone-correction methods can be used to reduce keystoning. For example, the distortion method can be applied to the entire image 50, and the rotation method can be applied to a subset of the image 50, such as the corners only, to confirm that the distortion method performed as expected on at least that subset of the pixels. If the two or more applied methods do not produce sufficiently similar results, then the keystone-correction unit 120 can default to one of the methods used, such as the rotation method.

The flattening unit 130 can reduce the curve of the text that generally results from the pages of a bound book being bent from the binding to the surface upon which the book sits. Because the left and right edges 450 of the book were made vertical during keystone-correction, the flattening unit 130 can assume that the horizontal distortion in the image 50 is already corrected. Accordingly, the flattening unit 130 can vertically flatten the content of the document in the image 50.

To flatten the source image 50 (i.e., the image received by the flattening unit 130), the flattening unit 130 can generate a destination image 50. In some embodiments, the width of the destination image 50 can be the width between the left and right edges 450 of the document, as determined during keystone-correction. Alternatively, if it is desired to create a wider or narrower document than that appearing in the keystone-corrected image 50, the width of the destination image 50 can be selected as a factor of the width of the keystone-corrected image 50. If desired, additional width can be added on one or both sides of the document for aesthetic appeal. Because this additional width lies outside the boundaries of the document, the pixels within the area corresponding to this additional width can be colored as desired, such as in a solid, aesthetically pleasing color. The height of the destination image 50 can be chosen in various manners. For example, in some embodiments, the height of the destination image 50 can be the pixel distance between the topmost pixel of the top edge 450 of the document and the bottommost pixel of the bottom edge 450 of the document in the source image 50.

For each pixel in the destination image 50, the flattening unit 130 can choose a pixel from the source image 50 to copy into that destination image pixel. Thus, for each pixel in the destination image 50 comprising a horizontal coordinate and a vertical coordinate, corresponding horizontal and vertical coordinates of the source image 50 (i.e., the keystone-corrected image) can be identified. The color of the identified source image pixel can then be copied to the destination image pixel currently being examined.

For a particular examined destination image pixel, if the width of the document in the destination image 50 was selected to be the same as the width in the source image 50, then the horizontal coordinate selected from the source can be the same as the horizontal coordinate of the examined destination image pixel. If additional width was added in the destination image 50, or if the width of the document was stretched by a factor in the destination image 50, then a linear mapping can be established based on these modifications. The linear mapping can be fixed across all pixels in the destination image 50, so that identification of the horizontal coordinate for each examined destination image pixel utilizes the same linear mapping to a horizontal coordinate in the source image 50. Accordingly, the flattening unit 130 can maintain the horizontal proportions of the image 50 established by the keystone-correction unit 120.

As shown in FIG. 6B, after keystone-correction, the image 50 can still be distorted vertically. The flattening unit 130 can correct this vertical distortion. For each vertical line of pixels in the destination image 50, the flattening unit 130 can establish and use a linear function mapping the vertical coordinate of an examined pixel to a vertical coordinate in the source image 50. The linear function can change between each vertical line of pixels in the destination image 50, so as to distort each vertical column in a different manner.

Figure 7:
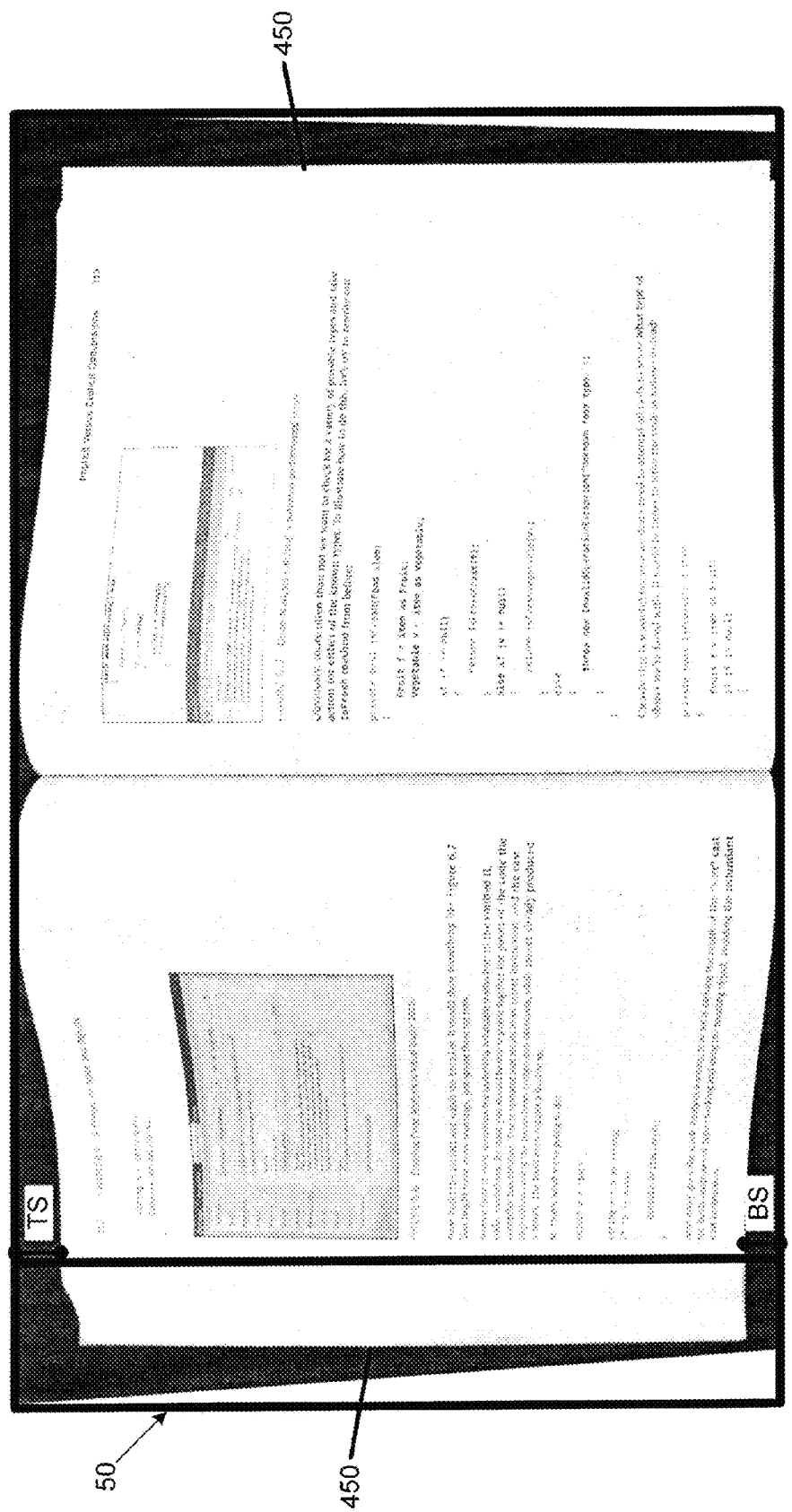
FIG. 7 illustrates an aspect of a flattening unit of the processing system, according to an exemplary embodiment of the present invention.

For each vertical line of pixels in the destination image 50, a top shift and a bottom shift can be determined based on the vertical line at the corresponding horizontal coordinate of the source image 50. The top shift can be the pixel distance between (a) the pixel of top edge of the document lying on the corresponding vertical line of the source image 50 and (b) the topmost pixel of the entire document in the source image 50. The bottom shift can be the pixel distance between (a) the pixel of the bottom edge of the document lying on the corresponding vertical line of the source image 50 and (b) the bottommost pixel of the document in the source image 50. FIG. 7 illustrates the top shift TS and bottom shift BS for a vertical line in a source image 50, according to an exemplary embodiment of the present invention. The vertical coordinate in the source image chosen for each pixel on the corresponding vertical line of the destination image 50 can be the vertical coordinate of that destination image pixel shifted by a linear interpolation between the top shift and the bottom shift. For example, where $Y_d$ is the vertical coordinate of the examined destination image pixel, and where H (not shown in figures) is the height of the document in the destination image 50, the following function $S(Y_d)$ can be used to identify the vertical coordinate of the corresponding vertical line of the source image 50:

$$S(Y_d) = Y_d + TS^*(1 - Y_d/H) + BS^*(Y_d/H).$$

Application of the above, or other appropriate, function to the vertical coordinate of each pixel in the destination image 50 to identify the corresponding vertical coordinate in the source image 50 can correct vertical distortion of the source image 50.

The recoloring unit 140 can convert the image 50 to a particular color palette, such as grayscale, black and white, other monochromatic, sepia, or other desired color palette.

Although an exemplary embodiment of the recoloring unit 140 can process the image 50 after edge-detection, keystone-correction, and flattening, this need not be the case. Rather, color-conversion can be performed at various alternative steps of the processing system 100.

Black and white conversion can be useful for text documents. Conversion to black and white can be performed by turning black all pixels darker than a predetermined threshold value and turning white all pixels lighter than a predetermined threshold value. The threshold value can be selected to be, for example, an average value of all pixel colors in the document.

In some exemplary embodiments, the color palette to which the image 50 is converted can at least partially depend on the type of document in the image 50, or the source material of the document, which can be detected by the processing system 100. For example, and not limitation, if the processing determines that the document was positioned at a distance greater than a threshold distance from the image-capture device, then the processing system 100 can assume that the document type and source material is a whiteboard or other display board. In that case, the recoloring unit 140 can brighten the various colors of the document, so as to make the colors aesthetically appealing and so as to make different colors easily distinguishable from one another. For another example, if it is determined that a portion of the document depicts an image or other non-text object, then that portion of the document can be excluded from color-conversion, or a different color-conversion treatment can be applied to that portion as compared to a text portion of the document.

In some exemplary embodiments, the recoloring unit 140 can correct or otherwise adjust brightness, color variation, or contrast of the image. Although some algorithms for performing this task are disclosed below, it will be understood that various other algorithms might alternatively be used. Further, it will be understood that the recoloring unit 140 can act independently of other aspects of the present invention, and recoloring can be provided even without steps being performed by the other units of the processing system.

The recoloring unit 140 can perform two primary steps, in some embodiments. First, the recoloring unit 140 can determine a background level for the image. The background level may be variable from pixel to pixel within the image. Then the recoloring unit 140 can adjust the pixel values based on the background level. The adjusted values can represent improved brightness, color variation, or contrast.

The image can be viewed as a plurality of groups, a subset of which may qualify for determining a background level of the image. An individual background level can be calculated for each qualified group, wherein a group may be required to meet one or more criteria to be deemed qualified. The unqualified groups can be assigned background levels based on proximate groups. Each group can be viewed as a plurality of subgroups, some of which may qualify for determining a background level of the group. A subgroup can be deemed to qualify if the standard deviation of the comparison values for each of its pixels is below a predetermined threshold, i.e., if the pixels within the subgroup are enough alike.

To find the background level of the image, the recoloring unit 140 can consider the image as groups of pixels. For example, and not limitation, we can group the pixels into squares, such as 64×64-pixel squares. For each group of pixels, the recoloring unit 140 can identify a background level for that group based on the pixels within the group.

Various means can be used to identify a background level for a particular pixel group. In an exemplary embodiment, a group can be viewed as a collection of subgroups. In the case of a 64×64 group, for example, a subgroup can be an 8×8-pixel square. In an exemplary embodiment, the subgroups can overlap. For instance, the first subgroup can be the upper right corner of the entire group, and each additional subgroup on the same row can be a shifted to the right by a number of pixels less than the width of subgroup, for example, by four pixels. Each row of the group can be shifted downward from the first row by a number of pixels that is less than the height of each subgroup, for example, four pixels. Thus, in a 64×64-pixel group, 225 subgroups can exist using the numbers provided above.

The recoloring unit 140 can examine each group individually to determine whether that group is a qualifying group, i.e., is likely to represent the background of the larger group. A group can be deemed a qualifying group if one or more of the following criteria are met: (1) there are at least a predetermined number of subgroups within the group that pass a first standard deviation test; (2) certain criteria are met for the standard deviations of each color channel across the subgroups that pass the first standard deviation test; (3) the group's background level meets a minimum brightness level; and (4) the group's color value is not too far from the average color level of the whole image. In an exemplary embodiment, all four criteria are required for a group to qualify.

Regarding the first criterion of the above four criteria for qualification of a group, the recoloring unit 140 can determine whether at least a predetermined number, e.g., 10, of the subgroups within a group pass a standard deviation test, and therefore qualify for consideration as part of the background of the group. In other words, while groups can qualify or not qualify for determining a background level of the whole image, likewise subgroups can qualify or not qualify for determining a background level of a group. A subgroup can be deemed to pass the standard deviation test when the comparison values of its individual pixels have a standard deviation that is less than a predetermined threshold.

The recoloring unit 140 can determine a comparison value for each pixel within a subgroup. For instance, the comparison value can be calculated as the sum of the red pixel value, the blue pixel value, and three times the green pixel value of a single pixel. If the standard variation of the various pixels within a subgroup is less than a threshold, such as the value of 14, then the subgroup can be deemed to pass the standard deviation test. The threshold can be chosen so that subgroups made up of pixels that are similar to one another are less than the threshold, as these pixels are likely to include a significant portion of a background of the subgroup.

Figure 8A:
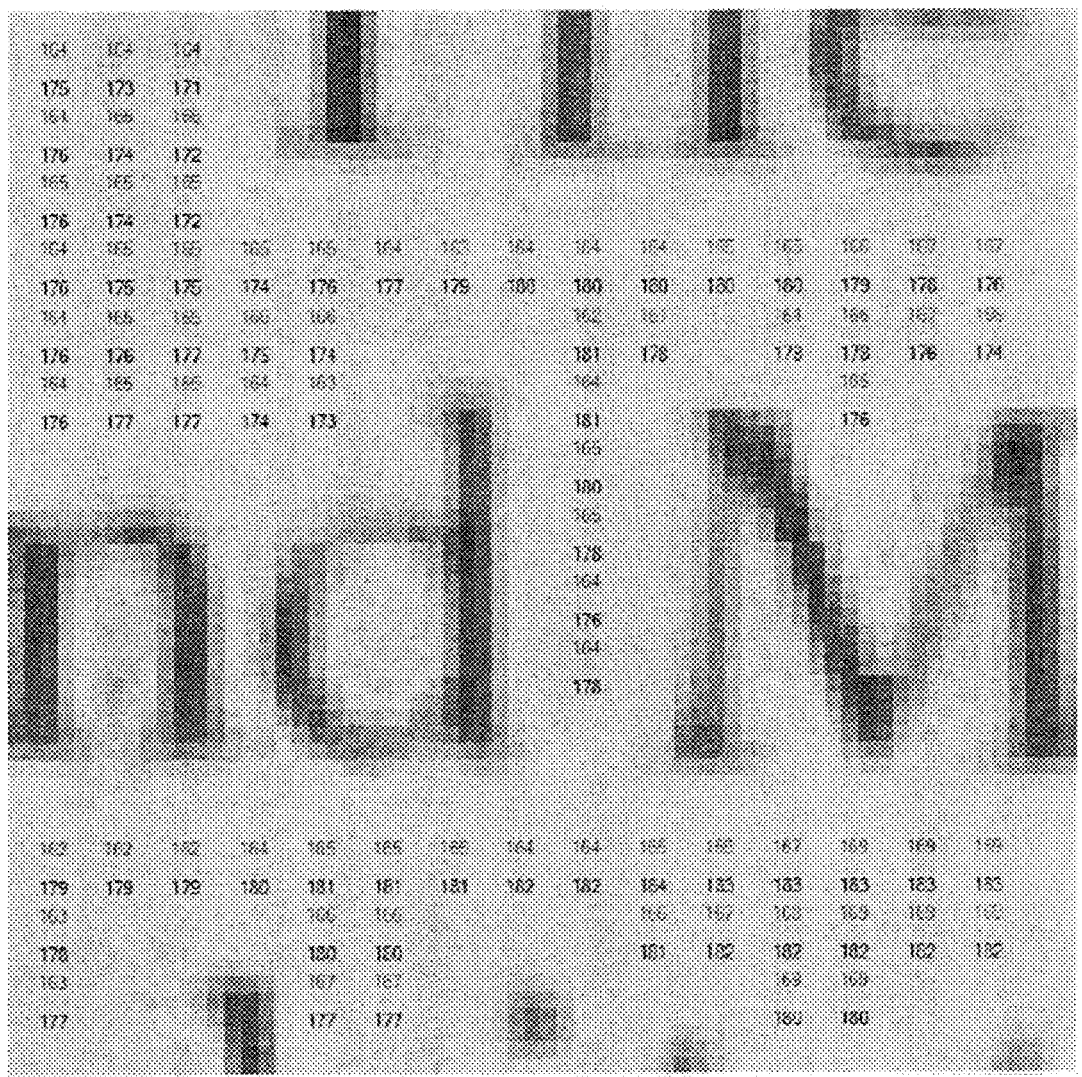
FIG. 8A illustrates various subgroups of pixels, within a group that qualifies for determining a background level of the image, according to an exemplary embodiment of the present invention.

FIG. 8A illustrates various subgroups of pixels, within a group that qualifies for determining a background level of the image, according to an exemplary embodiment of the present invention. More specifically, FIG. 8A shows the numerical red, green, and blue values for the 8×8 subgroups that have low enough standard deviations of their comparison values to be considered areas of the true background and, thus, to qualify for determining the background level of the group.

The first criterion for group qualification can be deemed met when at least a predetermined number of the subgroups qualify. In this case, an adequate number of subgroups have been identified within the group that look like portions of a background.

Regarding the second criteria, for a group of pixels to qualify for determining the image's background level, certain criteria must be met for the standard deviations of each color channel across the qualified subgroups. More specifically, the standard deviation across all pixels of the interior qualified subgroups can be calculated individually for each color channel. In the case of a red, green, and blue color domain, this results in three standard deviations for the group, one for each color. The recoloring unit 140 can then calculate a total, group-based standard deviation, which can be the square root of the sum of the color-channel standard deviations. If this total standard deviation is less than a predetermined value, e.g., 8, then this criterion for group qualification is met. If this group-based standard deviation is equal to or greater than the predetermined value, then the whole group of pixels fails to meet this particular criterion for group qualification.

Figure 8B:
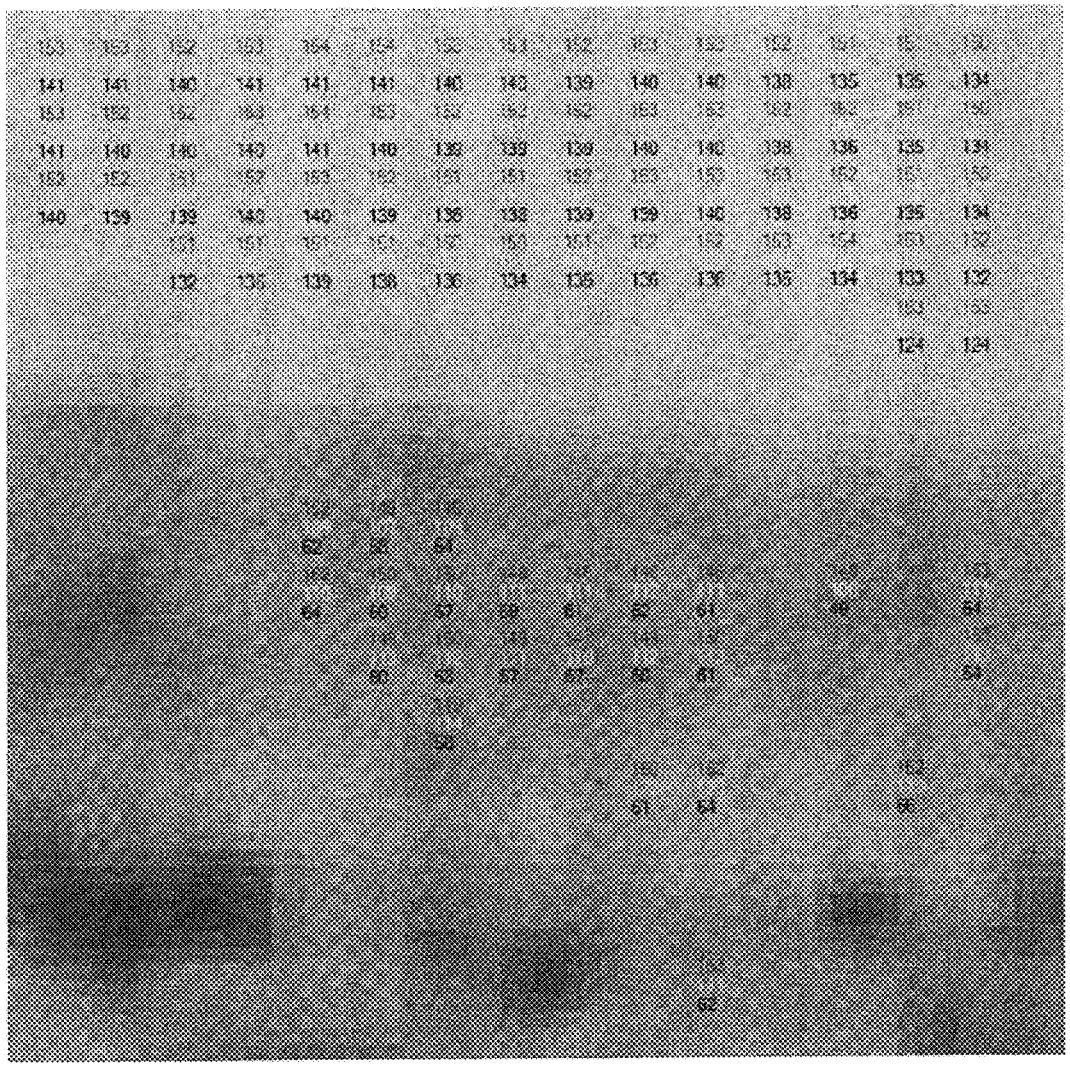
FIG. 8B illustrates various subgroups of pixels, within a group that fails to qualify for determining a background level of the image, according to an exemplary embodiment of the present invention.

The group shown in FIG. 8A has a group-based standard deviation of 3.9, so it meets the first criterion for qualification for determining a background level of the entire image. FIG. 8B illustrates various subgroups of pixels, within a group that fails this criterion for group qualification, according to an exemplary embodiment of the present invention. Although individual subgroups can be identified in this group that pass the standard deviation test with their comparison values, the group-based standard deviation is above the threshold. Accordingly, the subgroups are too different from one another, and this would not make a good square for calculating the background level.

Regarding the third criterion, for a group of pixels to qualify for determining the image's background level, the group's background level may be required to meet a minimum required brightness level. In other words, the recoloring unit 140 can reject groups that are dark enough that they are unlikely to be part of the real background. For example, these too-dark groups may represent parts of the image that are outside of the document page within the image.

A group can be deemed to be bright enough, i.e., meet the minimum required brightness level, if its green level (or alternatively, it's red level or blue level, or a level relating to a combination of the color channels) is at or above a predetermined minimum. To this end, the recoloring unit 140 can determine a green level for each group. The recoloring unit 140 can generate a histogram of the green values for all the qualifying subgroups within the group. The recoloring unit 140 can use this histogram to find determine what green level is just below the brightest 25% (or other predetermined percentage) of the subgroups. The recoloring unit 140 can then use a portion of this green level value, e.g., 50%, as a minimum brightness that a group as a whole must be in order to qualify for determining the background level of the entire image.

The above calculations use the green pixel values, but this is not a limitation of the present invention. It will be understood that the recoloring unit 140 can use the red or blue pixel values, or various combinations of the available color channels.

Regarding the fourth criterion, for a group of pixels to qualify for determining the image's background level, the group's color value can be required to be relatively close to the average color level of the whole image.

The recoloring unit 140 can find an average color value for the entire image. In an exemplary embodiment, the recoloring unit 140 does not, for this calculation, use groups that are far from white. Thus, the recoloring unit 140 can limit this calculation of an average color value to groups in which the shift from white is less or equal to a predetermined value, such as 0.1.

For the purpose of defining a color shift, define $x=r/(r+g+b)$ and $y=g/(r+g+b)$. Accordingly, white is at $x=0.3333$ and $y=0.3333$, where red (r), green (g), and blue (b) are all equal and at their maximum values. The white shift, or color shift from white, can be defined in two dimensions as $dx=x-0.3333$ and $dy=y-0.3333$. A value of the shift from white for a pixel can be defined as $sqrt(dx*dx+dy*dy)$.

The recoloring unit 140 can calculate the white shift of a group of pixels to be the average white shift of the pixels in the qualified subgroups of that group. Groups that have a white shift greater than the predetermined value can be rejected for the purpose of determining an average color value for the image. This particular rejection, however, does not disqualify groups from being used to determine the background level of the image. Rather, they are rejected only from determining the average color value of the image. The recoloring unit 140 can calculate the average color value of the image by averaging together the colors of the pixels in the groups that are not rejected, as discussed above, for this purpose. The recoloring unit 140 can then determine whether groups are too far from this average color value to meet this qualification criterion.

A group can fail to meet this fourth criterion of being close enough to the average color value, if the maximum error of the group from the average color value is greater than or equal to a predetermined value, e.g., 0.05. In other words, if the average color value of the group is further than 0.05 from the average color value of the whole image, then the group would fail on this criterion. This can remove from consideration, with respect to overall background level, pixel groups where the color is far enough away from the average that the group is likely not a part of the image's background.

The above four criteria, or whichever other criteria are used to qualify groups, can be evaluated for each group to determine which groups qualify for contributing to the background level of the entire image. In some embodiments, if at least one-eighth (or some other predetermined portion) of the pixel groups fail to qualify, then a uniform adjustment can be made to the entire image. For example, and not limitation, the recoloring unit 140 can identify the brightest 1% of the pixels, which brightness can be calculated as the simple sum of the red, green, and blue channels. For these brightest pixels, the recoloring unit 140 can calculate the average red, green, and blue values. All pixels in the image can then be scaled such that the average values for the top 1% of the pixels are set to 255, for red, green and blue. This adjustment can change the white balance and brightness of the image.

After it is determined which groups within the image qualify for determining the background level as a whole, the recoloring unit 140 can calculate a solid background level for each of these qualified groups. In an exemplary embodiment, the background level for a group can be the average color of the various pixels in the qualified subgroups within the group. In such an embodiment, the recoloring unit 140 can average the individual color channels across the pixels of the qualified subgroups. In other words, for example, the recoloring unit 140 can find an average red value across all pixels of the qualified subgroups of the group, and the recoloring unit 140 can do likewise for the green values and blue values. These average values are used together as the red, green, and blue channels of the background level for the entire group of pixels.

After the background levels have been calculated for the qualified groups, the recoloring unit 140 can assign background levels to the groups that did not qualify. The recoloring unit 140 can estimate a background level for each unqualified group based on the background levels of surrounding or proximate groups.

For example, and not limitation, the recoloring unit 140 can look for groups in all four directions relative to each unqualified group (i.e., up, down, right, and left) to identify one or more of the closest qualified groups, for which a background level was or will be calculated based on their own pixels. In an exemplary embodiment, four nearby qualified groups can be identified and selected for estimating a background level of the unqualified group. The background level for the unqualified group in question can then be calculated as a weighted average of the selected qualified groups, where the weight applied to each qualified group for determining the average is based on an inverse distance to the unqualified group in question.

For example, suppose that a background level is missing for a group positioned at column 21 and row 11 of the image, the first qualified group to the right is at column 30, the first qualified group to the left is at column 19, the first qualified group downward is at row 2, and the first qualified group upward is at row 15. In that case, the recoloring unit 140 can estimate the background level of the unqualified group as follows:

$$bg_{21,11} \frac{\frac{bg_{30,11}}{30-21} + \frac{bg_{19,11}}{21-19} + \frac{bg_{21,2}}{11-2} + \frac{bg_{21,15}}{15-11}}{\frac{1}{30-21} + \frac{1}{21-19} + \frac{1}{11-2} + \frac{1}{15-11}}$$

As shown, the recoloring unit 140 can normalize for sum of the scaling factors used from the four squares. If fewer than four surround groups are found (e.g., if the edge of the image is reached before a qualified group is identified), the recoloring unit 140 can use fewer qualified groups in the calculation. In the example above, below would represent the calculation if no qualified group were identified below the unqualified group in question:

$$bg_{21,11} \frac{\frac{bg_{30,11}}{30-21} + \frac{bg_{19,11}}{21-19} + \frac{bg_{21,2}}{11-2}}{\frac{1}{30-21} + \frac{1}{21-19} + \frac{1}{11-2}}$$

If no qualified groups are found when searching for nearby qualified groups relative to an unqualified group, then the background level of the unqualified group can be estimated from all the qualified groups in the image.

It should be noted that the above equations can be evaluated for each color channel: red, green, and blue. Other interpolation methods may alternatively be used, and the method above does not limit the various embodiments of the present invention.

After background levels are determined, in one way or another, for each pixel group in the image, the recoloring unit 140 can then interpolate between the background levels of the various pixel groups to generate a smooth overall background level, in which the individual groups are preferably not distinguishable in the overall background level.

The recoloring unit 140 can generate a background image, the same size as the original image, with each pixel value set to the background level of the group covering to the corresponding pixel in the original image. Then the recoloring unit 140 can examine each pixel in the background image and interpolate from the four closest groups to the given pixel, one of which can be the pixel's own group. The weighting for the four groups in the interpolation can be determined by how close the pixel is to the center of each of such groups.

Figure 9:
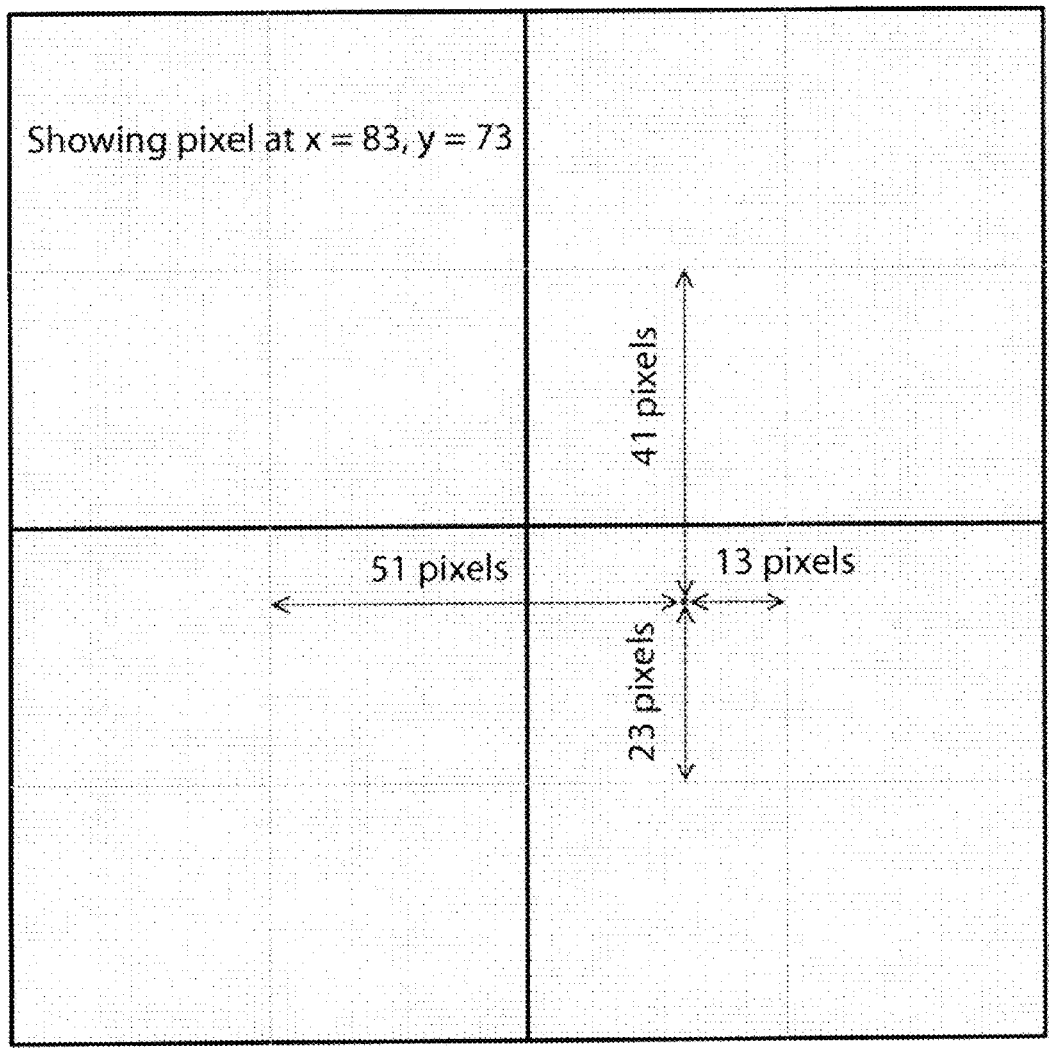
FIG. 9 illustrates an aspect of interpolation between background levels, according to an exemplary embodiment of the present invention.

FIG. 9 illustrates an aspect of interpolation between background levels, according to an exemplary embodiment of the present invention. In the figure, four groups of pixels are shown, with a pixel highlighted at location x=83 and y=73. The four pixels shown are the four groups closes to the highlighted pixel, for which a background level is being calculated. For the sake of this discussion, the upper left background group will be referred to as BG[0,0], the upper right will be BG[1,0], the lower left will be BG[0,1], and the lower right will be BG[1,1]. The contribution from a given background group can be its value multiplied by (1−dx/64)*(1−dy/64), where dx and dy represent the distance between the pixel being examined and the group being used in the interpolation. In the case of BG[0,0], dx=51 and dy=41, the recoloring unit 140 can multiply the level of this group by (1−51/64)*(1−41/64), or 0.073. Generating scaling factors for all four background squares gives: Interpolated Background=BG[0,0]*(1−51/64)*(1−41/64)+BG[1,0]*(1−13/64)*(1−41/64)+BG[0,1]*(1−51/64)*(1−23/64)+BG[1,1]*(1−13/64)*(1−23/64). As shown, the weighting factors for the four background squares will always add up to 1, with minor variation due to rounding of values.

It will be understood that the above calculation can be performed individually for each color channel for each pixel, and individually for each pixel.

Figure 10A:
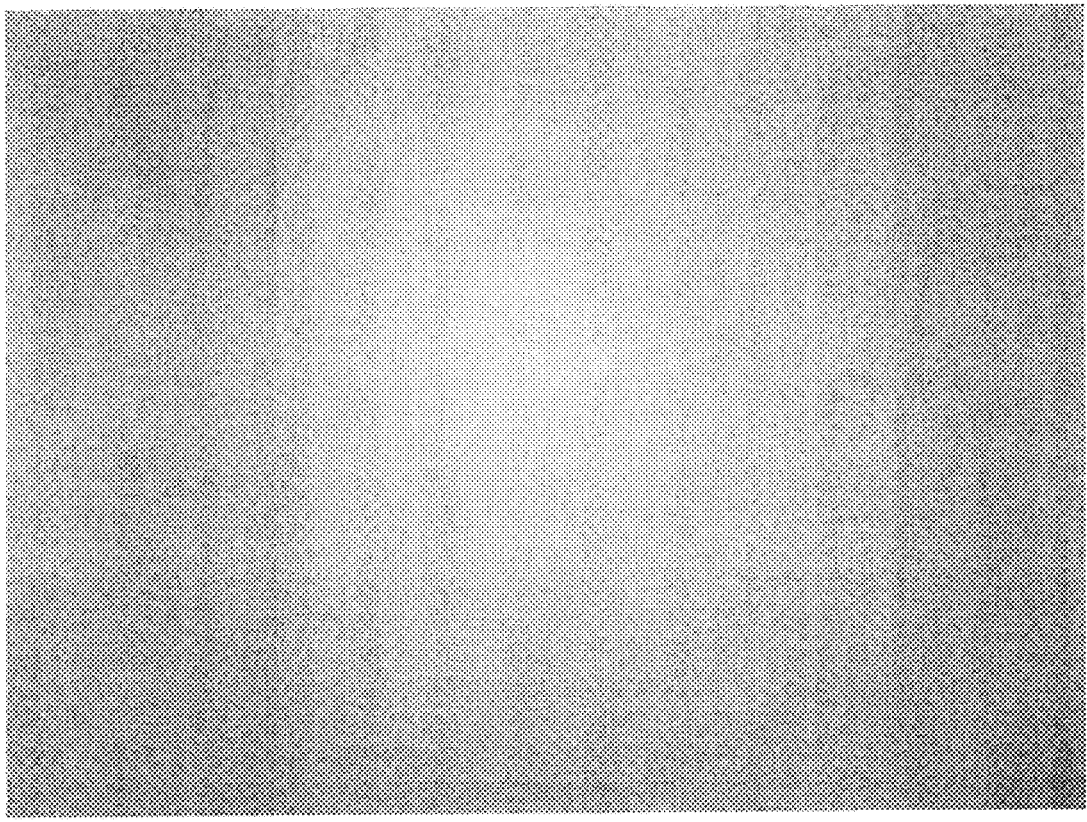
FIG. 10A illustrates an example background level image, before background level interpolation, according to an exemplary embodiment of the present invention.
Figure 10B:
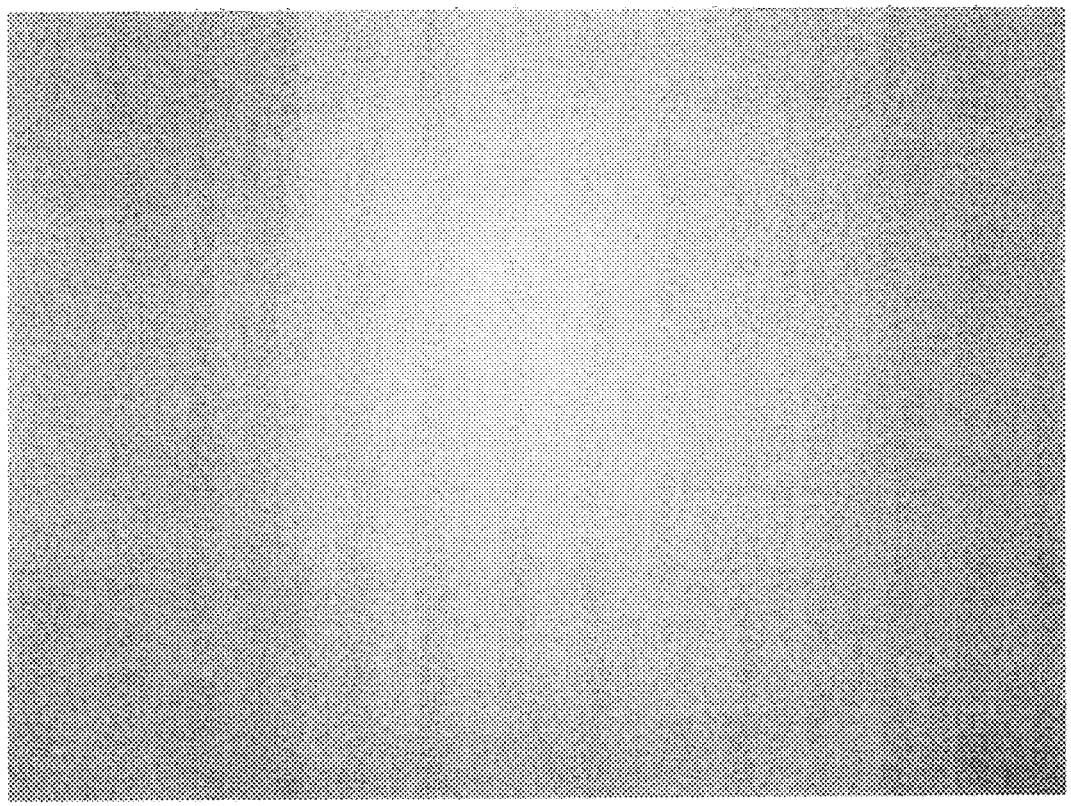
FIG. 10B illustrates an example background level image, after background level interpolation, according to an exemplary embodiment of the present invention.

FIG. 10A illustrates an example background level image, before background level interpolation. FIG. 10B illustrates an example background level image, after background level interpolation. As shown by comparing the two figures, it is difficult or impossible to distinguish the individual groups from one another in the background level image after interpolation.

After a smooth overall background level is determined, such as that shown in FIG. 10 B, the recoloring unit 140 can find a background level for each individual pixel in the original image by identifying the corresponding pixel in the background level image. The recoloring unit 140 can then adjust each pixel's value based on the corresponding background level of that pixel. In an exemplary embodiment, the adjustment may achieve one or more of the following: correct white balance errors, brighten the background to a good white level, and increase the contrast.

The recoloring unit 140 can adjust the white balance of the image as follows: Suppose the background levels are br, bg and bb, for red, green and blue. The recoloring unit 140 can do a first adjustment to each pixel of r=r*max/br, g=g*max/bg, and b=b*max/bb, where max is the largest of br, bg, and bb.

The recoloring unit 140 can find a new red, green, and blue for each pixel by adjusting the luminance without changing the color of the pixel. To this end, for each color channel, the recoloring unit 140 can select a first pixel value to map to 255 (or other value representing the maximum value for a color), as well as a second pixel to map to 0. More specifically, the highest pixel value in the image can be mapped to 255, and the highest pixel value times 0.25 can be mapped to 0. This mapping can result in a linear equation for each color channel, such as r2=r*scale+offset, where r2 represents the adjusted red channel value. For monochrome pixels, where r=g=b, the transformation is straightforward; r2=r*scale+offset, g2=g*scale+offset and b2=b*scale+offset, where (r2, g2, b2) represents the adjusted pixel values, and (r, g, b) represents the pixel value prior to the adjustment. Using this mapping for each pixel, the recoloring unit 104 can adjust the image's luminance.

When this transformation is performed on color pixels, i.e., non-monochrome, the saturation may increase by a large amount, giving the color an unnatural look. To keep the colors from shifting in this manner, the recoloring unit 140 can take a slightly modified approach. It can find an initial average value of the red, green, and blue values, i.e. (r+g+b)/3, and use this initial average to calculate a target average value. The recoloring unit 140 can define the target average value=initial average*scale+offset, using the scale and offset calculated above for adjusting luminance. It may be undesirable for the target average to be a negative value, so if this the case, the recoloring unit 104 can set the target average to be equal to zero, instead of leaving it below zero. The recoloring unit 140 can determine a scaling factor, which can be the target average divided by the initial average. The scaling factor can then be used to adjust the color channels; the pixel values can be adjusted by multiplying each color channel by the scaling factor. For monochrome pixels, this gives the same results as the first transformation, but for pixels with color, the ratios of the three colors does not change. Accordingly, this scaling can be performed on all pixels without having to determine whether each pixel is color or monochrome.

Although the above transformation does not change the saturation of the colors, the areas of the image that become darker subjectively look darker. To compensate for this effect, the recoloring unit 140 can use a combination of these two transformation methods to arrive at the final pixel values. For example, a 40% color contribution can be taken from application the method that is based on adjusting the average values, and a 60% color contribution can be taken based on the method where the three colors are adjusted independently.

Figure 11A:
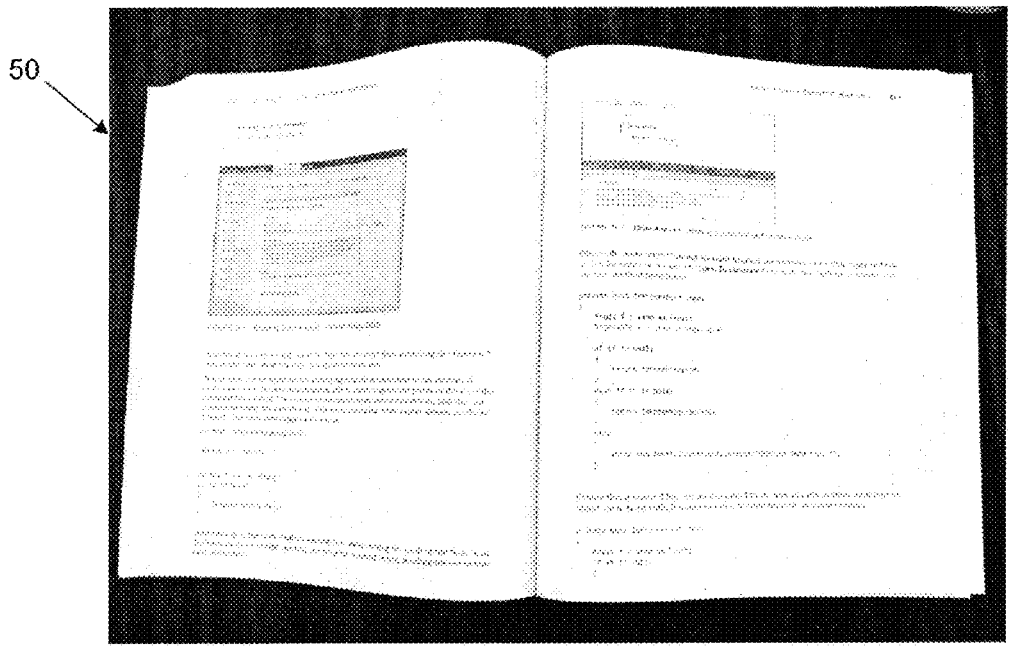
FIG. 11A-11B are photographs of an exemplary result of processing an image by the processing system, according to an exemplary embodiment of the present invention.
Figure 11B:
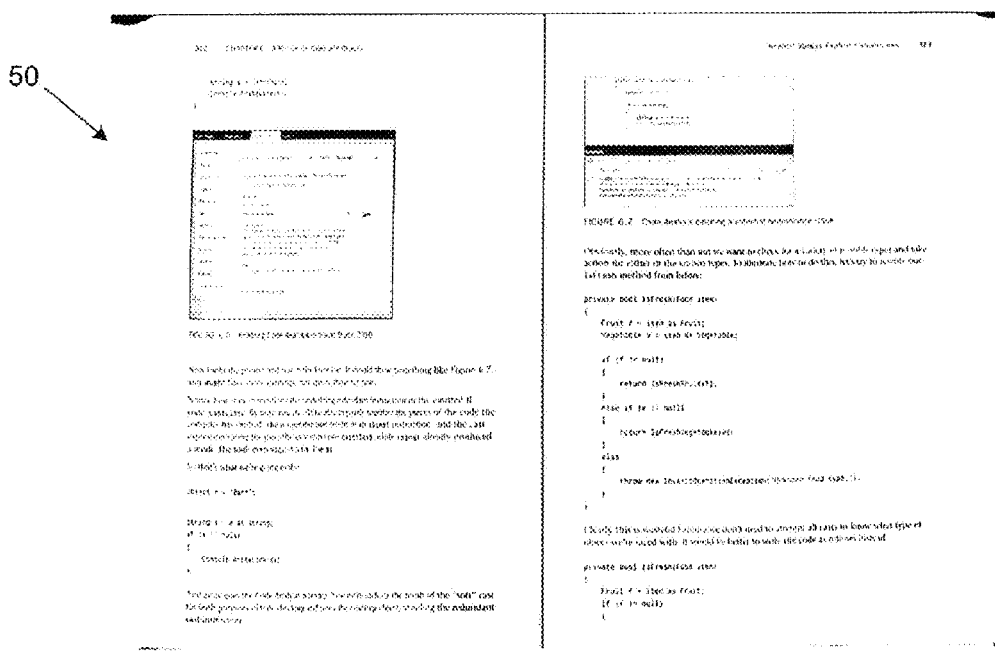

FIGS. 11A-11B are photographs of an exemplary result of the processing system, after application of the edge-detection unit 110, the keystone-correction unit 120, the flattening unit 130, and the recoloring unit 140. FIG. 11A illustrates an initial image 50 of a book captured by a camera, while FIG. 11B illustrates a resulting image 50, which can be the result of processing the initial image 50 through the processing system 100. As shown in FIG. 11A, the pages of the book in the initial image 50 can be distorted as a result of various factors, including, for example, the camera position and orientation, properties of the camera lens, and inability to place the pages of the book into a plane. As shown in FIG. 11B, the processing system 100 can reduce distortion to provide a more easily readable and eye-pleasing image.

Figure 12:
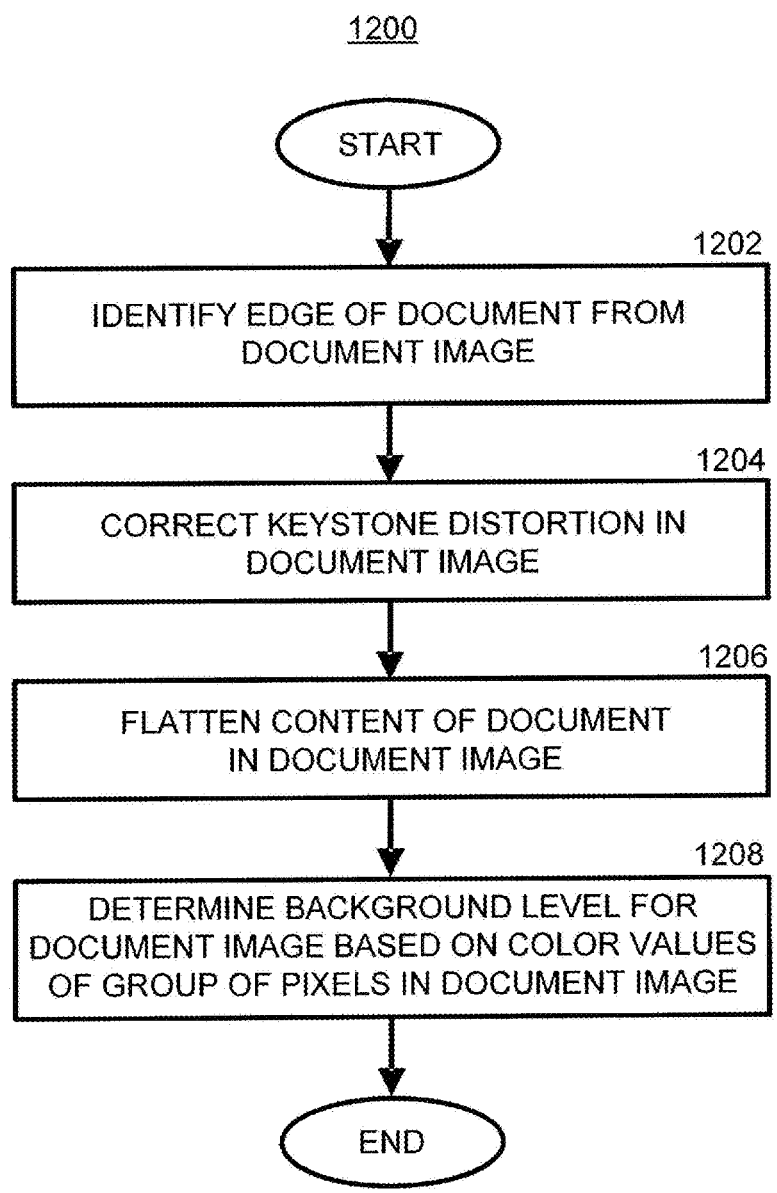
FIG. 12 is a flow diagram illustrating steps of a method of processing a document image, according to an exemplary embodiment of the present invention.

FIG. 12 is a flow diagram illustrating steps of a method 1200 of processing a document image, according to an exemplary embodiment of the present invention. The method 1200 begins at step 1202, identifying an edge of a document from a document image. From step 1202, the method proceeds to step 1204, correcting keystone distortion in the document image. Next, at step 1206, content of the document in the document image is flattened. From step 1206, the method 1200 proceeds to step 1208, determining a background level for the document image based on color values of a group of pixels in the document image.

Accordingly, as discussed in detail above, processing systems and methods according to embodiments of the present invention can unbend and enhance images of book pages and other documents, so as to enable a more pleasant reading experience and more accurate character-recognition of the pages.

Numerous characteristics and advantages have been set forth in the foregoing description, together with details of structure and function. While various embodiments of the processing systems and methods have been disclosed in exemplary forms, many modifications, additions, and deletions can be made without departing from the spirit and scope of the present invention and its equivalents as set forth in the following claims. Therefore, other modifications or embodiments as may be suggested by the teachings herein are particularly reserved as they fall within the breadth and scope of the claims here appended.

What is claimed is:

1. A system for processing a document image, comprising one or more processors, and a memory coupled to the one or more processors and storing instructions that, when executed by the one or more processors, cause the system to:
   identify one or more edges of a document from the document image, wherein identifying the one or more edges of the document comprises at least one of applying an edge-finding filter to the document image and selecting a ranked potential edge of the document image, the potential edge being ranked based on one or more of a straightness of the potential edge and an intersection of the potential edge with at least one other potential edge;
   correct keystone distortion in the document image; and
   flatten content of the document in the document image.

2. The system of claim 1, wherein the edge of the document image corresponds to an edge of content of the document in the document image, the content comprising at least one of text and objects.

3. The system of claim 1, wherein applying the edge-finding filter to the document image comprises applying a convolution filter to a single channel of pixel color values of the document image.

4. The system of claim 1, wherein a potential edge is ranked based on a combination of:
   a length of the potential edge;
   the straightness of the potential edge;
   a vertical or horizontal orientation of the potential edge; and
   the intersection of the potential edge with at least one other potential edge.

5. The system of claim 1, wherein correcting the keystone distortion comprises:
   determining a field of view of an image capture device used to capture the document image;
   based on the field of view, determining at least one rotation to apply to the document image to render the document flat in the document image; and
   applying the at least one rotation to the document.

6. The system of claim 1, wherein correcting the keystone distortion comprises:
   identifying a corner of the document based on edges of the document identified by the edge-detection unit, the corner formed with a first edge and second edge; and
   distorting the document image based on the identified corner to render the first edge of the corner substantially perpendicular to the second edge of the corner.

7. The system of claim 6, the memory further storing instructions that, when executed by the one or more processors, cause the system to:

after distorting the document image, determine whether the first edge or second edge in the document image corresponds to a side edge of the document; and responsive to determining that the corresponding side edge in the document image has a curved portion, replace at least the curved portion in the document image with a substantially vertical line.

8. The system of claim 6, the memory further storing instructions that, when executed by the one or more processors, cause the system to:

after distorting the document image, determine whether the first edge or second edge in the document image corresponds to a top edge or bottom edge of the document; and responsive to determining that the corresponding first edge or second edge in the document image includes a curved portion, replace at least the curved portion in the document image with a substantially horizontal line.

9. The system of claim 1, the memory further storing instructions that, when executed by the one or more processors, cause the system to:

detect that, proximate an intersection between a first identified edge and a second identified edge, the first identified edge becomes nonlinear; and linearly extend the first identified edge to the intersection with the second identified edge.

10. The system of claim 1, wherein the flattening comprises:

determining a virtual first horizontal line passing through a topmost vertical coordinate at a top edge of the document in the document image;

determining a virtual second horizontal line passing through a bottommost vertical coordinate at a bottom edge of the document in the document image; and determining a linear interpolation between a downward shift from the virtual first horizontal line to the top edge of the document in the document image and an upward shift from the virtual second horizontal line to the identified bottom edge of the document in the document image.

11. The system of claim 1, the memory further storing instructions that, when executed by the one or more processors, cause the system to: determine, via a recoloring unit, a background level for the document image based on a background level of a group of pixels in the document image.

12. The system of claim 11, wherein determining the background level for the document image comprises determining, for the group of pixels, if comparison values of individual pixels of a subgroup of pixels within the group of pixels have a standard deviation less than predetermined threshold value.

13. The system of claim 12, wherein the comparison values correspond to at least one of a sum and multiple of color component values for the pixels.

14. The system of claim 11, wherein determining the background level for the document image comprises determining, from the group of pixels:

a standard deviation for each color channel across each of a plurality of subgroups of pixels; and a total standard deviation formed from the color channel standard deviations.

15. The system of claim 11, wherein determining the background level for the document image comprises determining a deviation of a color value associated with the group of pixels from an average color level associated with the document image.

16. A system for processing a document image, comprising one or more processors, and a memory coupled to the one or more processors and storing instructions that, when executed by the one or more processors, cause the system to:

identify one or more edges of a document from a document image;

correct keystone distortion in the document image; and flatten content of the document in the document image, wherein the flattening comprises:

determining a virtual first horizontal line passing through a vertical coordinate at a top edge of the document in the document image;

determining a virtual second horizontal line passing through a vertical coordinate at a bottom edge of the document in the document image; and determining a linear interpolation between a downward shift from the virtual first horizontal line to the top edge of the document in the document image and an upward shift from the virtual second horizontal line to the identified bottom edge of the document in the document image.

17. The system of claim 16, wherein the edge of the document image corresponds to an edge of content of the document in the document image.

18. The system of claim 16, wherein identifying the edge of the document from the document image comprises applying a filter matrix to pixel color values in the document image.

19. The system of claim 16, wherein identifying an edge of the document from the document image comprises selecting a potential edge of the document image based on a ranking of the potential edge in comparison to other potential edges.

20. The system of claim 19, wherein the ranking of a potential edge is based on at least one of:

a length of the potential edge;

a smoothness of the potential edge;

a vertical or horizontal orientation of the potential edge; and an intersection of the potential edge with at least one other potential edge.

21. The system of claim 16, wherein correcting the keystone distortion comprises:

determining a field of view of an image capture device used to capture the document image; and based on the field of view, determining at least one rotation to apply to the document image to render the document flat in the document image.

22. The system of claim 16, wherein correcting the keystone distortion comprises:

identifying a corner of the document based on the identified edges of the document from the document image, the corner formed with a first edge and second edge; and distorting the document image based on the identified corner to render the first edge of the corner substantially perpendicular to the second edge of the corner.

23. The system of claim 16, the memory further storing instructions that, when executed by the one or more processors, cause the system to: determine, via a recoloring unit, determine a background level for the document image based on color values of a group of pixels in the document image.

24. A method of processing a document image, comprising:

identifying one or more edges of a document from a document image;

correcting keystone distortion in the document image; and flattening content of the document in the document image, wherein the flattening comprises:

determining a virtual first horizontal line passing through a vertical coordinate at a top edge of the document in the document image;

determining a virtual second horizontal line passing through a vertical coordinate at a bottom edge of the document in the document image; and determining a linear interpolation between a downward shift from the virtual first horizontal line to the top edge of the document in the document image and an upward shift from the virtual second horizontal line to the identified bottom edge of the document in the document image.

25. The method of claim 24, wherein the edge of the document image corresponds to an edge of content of the document in the document image.

26. The method of claim 24, wherein identifying the edge of the document from the document image comprises applying a filter matrix to pixel color values in the document image.

27. The method of claim 24, wherein identifying an edge of the document from the document image comprises selecting a potential edge of the document image based on a ranking of the potential edge in comparison to other potential edges.

28. The method of claim 27, wherein the ranking of a potential edge is based on a combination of:

a length of the potential edge;

a smoothness of the potential edge;

a vertical or horizontal orientation of the potential edge; and an intersection of the potential edge with at least one other potential edge.

29. The method of claim 24, wherein correcting the keystone distortion comprises:

determining a field of view of an image capture device used to capture the document image; and based on the field of view, determining at least one rotation to apply to the document image to render the document flat in the document image.

30. The method of claim 24, wherein correcting the keystone distortion comprises:

identifying a corner of the document based on the identified edges of the document from the document image, the corner formed with a first edge and second edge; and distorting the document image based on the identified corner to render the first edge of the corner substantially perpendicular to the second edge of the corner.

31. The method of claim 24, further comprising determining a background level for the document image based on color values of a group of pixels in the document image.

32. The method of claim 24, further comprising:

detecting that, proximate an intersection between a first identified edge and a second identified edge, the first identified edge becomes nonlinear; and linearly extending the first identified edge to the intersection with the second identified edge.

* * * * *